United States Patent
White et al.

(10) Patent No.: US 9,940,931 B2
(45) Date of Patent: *Apr. 10, 2018

(54) CORRECTIVE FEEDBACK LOOP FOR AUTOMATED SPEECH RECOGNITION

(71) Applicant: Amazon Technologies, Inc., Seattle, WA (US)

(72) Inventors: Marc White, Charlotte, NC (US); Igor Roditis Jablokov, Charlotte, NC (US); Victor Roman Jablokov, Charlotte, NC (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/201,188

(22) Filed: Jul. 1, 2016

(65) Prior Publication Data
US 2017/0004831 A1    Jan. 5, 2017

Related U.S. Application Data

(63) Continuation of application No. 14/341,054, filed on Jul. 25, 2014, now Pat. No. 9,384,735, which is a
(Continued)

(51) Int. Cl.
*G10L 15/00* (2013.01)
*G10L 15/26* (2006.01)
(Continued)

(52) U.S. Cl.
CPC .......... *G10L 15/26* (2013.01); *G06F 3/0236* (2013.01); *G10L 15/183* (2013.01); *G10L 15/22* (2013.01);
(Continued)

(58) Field of Classification Search
CPC .......... G10L 15/26; G10L 15/30; H04L 51/00
(Continued)

(56) References Cited

U.S. PATENT DOCUMENTS 5,675,507 A    10/1997  Bobo, II
5,852,801 A    12/1998  Hon
(Continued)

FOREIGN PATENT DOCUMENTS

EP         1274222 A2     1/2003
WO    WO 2006/101528 A1   9/2006

OTHER PUBLICATIONS

Bisani, M., et al., Automatic Editing in a Back-End Speech-to-Text System, 2008, 7 pages.
(Continued)

*Primary Examiner* — Daniel Abebe
(74) *Attorney, Agent, or Firm* — Knobbe, Martens, Olson & Bear, LLP

(57) ABSTRACT

A method for facilitating the updating of a language model includes receiving, at a client device, via a microphone, an audio message corresponding to speech of a user; communicating the audio message to a first remote server; receiving, that the client device, a result, transcribed at the first remote server using an automatic speech recognition system ("ASR"), from the audio message; receiving, at the client device from the user, an affirmation of the result; storing, at the client device, the result in association with an identifier corresponding to the audio message; and communicating, to a second remote server, the stored result together with the identifier.

16 Claims, 23 Drawing Sheets

400

| That man | in here | is a | serial | killer. |

| that man | 45% | engineer | 35% | is a | 34% | cereal | 32% | filler | 52% |
|---|---|---|---|---|---|---|---|---|---|
| batman | 21% | engine ear | 23% | was a | 31% | serial | 31% | killer | 15% |
| hat man | 13% | in here | 12% | was uh | 26% | see real | 20% | biller | 14% |
|  |  | in ear | 11% |  |  | surreal | 12% | fuller | 10% |

Related U.S. Application Data continuation of application No. 13/621,189, filed on Sep. 15, 2012, now Pat. No. 8,793,122, which is a continuation of application No. 12/407,502, filed on Mar. 19, 2009, now Pat. No. 8,352,264.

(60) Provisional application No. 61/038,048, filed on Mar. 19, 2008, provisional application No. 61/041,219, filed on Mar. 31, 2008.

(51) Int. Cl.
  *G06F 3/023* (2006.01)
  *G10L 15/183* (2013.01)
  *G10L 15/22* (2006.01)
  *G10L 15/30* (2013.01)
  *G10L 15/19* (2013.01)
  *G10L 15/06* (2013.01)

(52) U.S. Cl.
  CPC .............. *G10L 15/30* (2013.01); *G10L 15/19* (2013.01); *G10L 2015/0631* (2013.01)

(58) Field of Classification Search
  USPC ........................................................ 704/235
  See application file for complete search history.

(56) References Cited

U.S. PATENT DOCUMENTS

| | | |
|---|---|---|
| 5,974,413 A | 10/1999 | Beauregard et al. |
| 5,995,928 A | 11/1999 | Nguyen |
| 6,100,882 A | 8/2000 | Sharman et al. |
| 6,173,259 B1 | 1/2001 | Bijl et al. |
| 6,219,407 B1 | 4/2001 | Kanevsky et al. |
| 6,219,638 B1 | 4/2001 | Padmanabhan et al. |
| 6,253,177 B1 | 6/2001 | Lewis et al. |
| 6,298,326 B1 | 10/2001 | Feller |
| 6,453,290 B1 | 9/2002 | Jochumson |
| 6,490,561 B1 | 12/2002 | Wilson et al. |
| 6,532,446 B1 | 3/2003 | King |
| 6,604,077 B2 | 8/2003 | Dragosh et al. |
| 6,654,448 B1 | 11/2003 | Agraharam et al. |
| 6,687,339 B2 | 2/2004 | Martin |
| 6,687,689 B1 | 2/2004 | Fung et al. |
| 6,760,700 B2 | 7/2004 | Lewis et al. |
| 6,775,360 B2 | 8/2004 | Davidson |
| 6,816,468 B1 | 11/2004 | Cruickshank |
| 6,816,578 B1 | 11/2004 | Kredo et al. |
| 6,820,055 B2 | 11/2004 | Saindon et al. |
| 6,850,609 B1 | 2/2005 | Schrage |
| 6,859,996 B1 * | 3/2005 | Slife .................... G11B 5/4813 29/603.03 |
| 6,895,084 B1 | 5/2005 | Saylor et al. |
| 6,961,700 B2 | 11/2005 | Mitchell et al. |
| 7,013,275 B2 | 3/2006 | Arnold |
| 7,133,513 B1 | 11/2006 | Zhang |
| 7,146,320 B2 | 12/2006 | Ju et al. |
| 7,146,615 B1 | 12/2006 | Hervet et al. |
| 7,181,387 B2 | 2/2007 | Ju et al. |
| 7,200,555 B1 | 4/2007 | Ballard et al. |
| 7,206,932 B1 | 4/2007 | Kirchhoff |
| 7,225,224 B2 | 5/2007 | Nakamura |
| 7,233,655 B2 | 6/2007 | Gailey et al. |
| 7,236,580 B1 | 6/2007 | Sarkar et al. |
| 7,254,384 B2 | 8/2007 | Gailey et al. |
| 7,280,966 B2 | 10/2007 | Ju et al. |
| 7,302,280 B2 | 11/2007 | Hinckley et al. |
| 7,310,601 B2 | 12/2007 | Nishizaki et al. |
| 7,313,526 B2 | 12/2007 | Roth et al. |
| 7,330,815 B1 | 2/2008 | Jochumson |
| 7,363,229 B2 | 4/2008 | Falcon et al. |
| 7,376,556 B2 | 5/2008 | Bennett |
| 7,392,185 B2 | 6/2008 | Bennett |
| 7,496,625 B1 | 2/2009 | Belcher et al. |
| 7,555,431 B2 | 6/2009 | Bennett |
| 7,571,100 B2 | 8/2009 | Lenir et al. |
| 7,577,569 B2 | 8/2009 | Roth et al. |
| 7,590,534 B2 | 9/2009 | Vatland |
| 7,640,158 B2 | 12/2009 | Detlef et al. |
| 7,657,424 B2 | 2/2010 | Bennett |
| 7,668,718 B2 | 2/2010 | Kahn et al. |
| 7,672,841 B2 | 3/2010 | Bennett |
| 7,702,508 B2 | 4/2010 | Bennett |
| 7,725,307 B2 | 5/2010 | Bennett |
| 7,725,321 B2 | 5/2010 | Bennett |
| 7,729,904 B2 | 6/2010 | Bennett |
| 7,729,912 B1 | 6/2010 | Bacchiani et al. |
| 7,757,162 B2 | 7/2010 | Barrus et al. |
| 7,809,574 B2 * | 10/2010 | Roth ....................... G10L 15/14 704/270 |
| 7,899,670 B1 | 3/2011 | Young et al. |
| 7,899,671 B2 * | 3/2011 | Cooper ................. G10L 15/065 704/231 |
| 8,027,836 B2 | 9/2011 | Baker et al. |
| 8,032,372 B1 | 10/2011 | Zimmerman et al. |
| 8,050,918 B2 | 11/2011 | Ghasemi et al. |
| 8,145,493 B2 | 3/2012 | Cross, Jr. et al. |
| 8,209,184 B1 | 6/2012 | Dragosh et al. |
| 8,296,139 B2 | 10/2012 | Da Palma et al. |
| 8,401,850 B1 | 3/2013 | Jochumson |
| 8,510,094 B2 | 8/2013 | Chin et al. |
| 8,793,122 B2 | 7/2014 | White et al. |
| 9,009,055 B1 | 4/2015 | Jablokov et al. |
| 9,369,581 B2 * | 6/2016 | Hirschberg ........... H04M 3/533 |
| 9,384,735 B2 | 7/2016 | White et al. |
| 9,542,944 B2 | 1/2017 | Jablokov et al. |
| 2001/0056350 A1 | 12/2001 | Calderone |
| 2002/0029101 A1 | 3/2002 | Larson et al. |
| 2002/0035474 A1 | 3/2002 | Alpdemir |
| 2002/0052781 A1 | 5/2002 | Aufricht et al. |
| 2002/0161579 A1 | 10/2002 | Saindon et al. |
| 2002/0165719 A1 | 11/2002 | Wang et al. |
| 2003/0008661 A1 | 1/2003 | Joyce et al. |
| 2003/0050778 A1 | 3/2003 | Nguyen et al. |
| 2003/0101054 A1 | 5/2003 | Davis et al. |
| 2003/0105630 A1 | 6/2003 | MacGinitie et al. |
| 2003/0125955 A1 | 7/2003 | Arnold et al. |
| 2003/0126216 A1 | 7/2003 | Avila et al. |
| 2003/0182113 A1 | 9/2003 | Huang |
| 2003/0200093 A1 | 10/2003 | Lewis et al. |
| 2003/0212554 A1 | 11/2003 | Vatland |
| 2003/0223556 A1 | 12/2003 | Ju et al. |
| 2004/0005877 A1 | 1/2004 | Väänänen |
| 2004/0015547 A1 | 1/2004 | Griffin et al. |
| 2004/0107107 A1 | 6/2004 | Lenir et al. |
| 2005/0010641 A1 | 1/2005 | Staack |
| 2005/0021344 A1 | 1/2005 | Davis et al. |
| 2005/0080786 A1 | 4/2005 | Fish et al. |
| 2005/0101355 A1 | 5/2005 | Hon et al. |
| 2005/0102142 A1 | 5/2005 | Soufflet et al. |
| 2005/0165609 A1 | 7/2005 | Zuberec et al. |
| 2005/0177376 A1 * | 8/2005 | Cooper ................. G10L 15/065 704/277 |
| 2005/0188029 A1 | 8/2005 | Asikainen et al. |
| 2005/0197145 A1 | 9/2005 | Chae et al. |
| 2005/0203751 A1 * | 9/2005 | Stevens .................. G10L 15/22 704/276 |
| 2005/0209868 A1 | 9/2005 | Wan et al. |
| 2005/0239495 A1 | 10/2005 | Bayne |
| 2005/0240406 A1 | 10/2005 | Carroll |
| 2005/0261907 A1 | 11/2005 | Smolenski et al. |
| 2005/0288926 A1 | 12/2005 | Benco et al. |
| 2006/0052127 A1 | 3/2006 | Wolter |
| 2006/0053016 A1 | 3/2006 | Falcon et al. |
| 2006/0149558 A1 | 7/2006 | Kahn et al. |
| 2006/0161429 A1 | 7/2006 | Falcon et al. |
| 2006/0195541 A1 | 8/2006 | Ju et al. |
| 2006/0217159 A1 | 9/2006 | Watson |
| 2007/0005795 A1 | 1/2007 | Gonzalez |
| 2007/0043569 A1 | 2/2007 | Potter et al. |
| 2007/0086773 A1 | 4/2007 | Ramsten et al. |
| 2007/0106507 A1 | 5/2007 | Charoenruengkit et al. |
| 2007/0115845 A1 | 5/2007 | Hochwarth et al. |
| 2007/0156400 A1 | 7/2007 | Wheeler |

(56) References Cited

U.S. PATENT DOCUMENTS

| | | |
|---|---|---|
| 2007/0180718 A1 | 8/2007 | Fourquin et al. |
| 2007/0233487 A1 | 10/2007 | Cohen et al. |
| 2007/0239837 A1 | 10/2007 | Jablokov et al. |
| 2008/0052073 A1* | 2/2008 | Goto .................. G10L 15/06 704/251 |
| 2008/0077406 A1 | 3/2008 | Ganong, III |
| 2008/0195588 A1 | 8/2008 | Kim et al. |
| 2008/0198981 A1 | 8/2008 | Skakkebaek et al. |
| 2008/0243500 A1 | 10/2008 | Bisani et al. |
| 2008/0261564 A1 | 10/2008 | Logan |
| 2008/0275864 A1 | 11/2008 | Kim et al. |
| 2009/0055175 A1 | 2/2009 | Terrell, II et al. |
| 2009/0076917 A1 | 3/2009 | Jablokov et al. |
| 2009/0083032 A1 | 3/2009 | Jablokov et al. |
| 2009/0124272 A1 | 5/2009 | White et al. |
| 2009/0163187 A1 | 6/2009 | Terrell, II |
| 2009/0182560 A1 | 7/2009 | White |
| 2009/0210214 A1 | 8/2009 | Qian et al. |
| 2009/0228274 A1 | 9/2009 | Terrell, II et al. |
| 2009/0240488 A1 | 9/2009 | White et al. |
| 2009/0248415 A1 | 10/2009 | Jablokov et al. |
| 2010/0049525 A1 | 2/2010 | Paden |
| 2010/0058200 A1 | 3/2010 | Jablokov et al. |
| 2012/0324391 A1 | 12/2012 | Tocci |
| 2013/0211815 A1* | 8/2013 | Seligman ............ G06F 17/2755 704/2 |
| 2014/0136199 A1* | 5/2014 | Hager .................. G06Q 10/107 704/235 |
| 2015/0255067 A1 | 9/2015 | White et al. |

OTHER PUBLICATIONS

Desilets, A., et al., Extracting Keyphrases From Spoken Audio Documents, Springer-Verlag Berlin Heidelberg, 2002, 15 pages.

Fielding, et al., Hypertext Transfer Protocol-HTTP/ 1.1, RFC 2616, Network Working Group, sections 7,9.5, 14.30, 12 pages, Jun. 1999.

Glaser, et al., Web-based Telephony Bridges for the Deaf, proceedings of the South African Telecommunications Networks & Applications Conference (SATNAC 2003), George, South Africa, 5 pages.

International Search Report and Written Opinion of the International Search Authority (Korean Intellectual Property Office) in Yap, Inc. International Patent Application Serial No. PCT/US2007/008621, dated Nov. 13, 2007, 13 pages.

J2EE Application Overview, publicly available on http://www/orionserver.comldocs/j2eeoverview.html since Mar. 1, 2001. Retrieved on Oct. 26, 2007, 3 pages.

Justo, R., et al., Phrase Classes in Two-Level Language Models for ASR, Springer-Verlag London Limited, 2008, 11 pages.

Kemsley, D.H., et al., A Survey of Neural Network Research and Fielded Applications, 1992, In International Journal of Neural Networks, Research and Applications, vol. 2, No. 2/3/4, pp. 123-133. Accessed on Oct. 25, 2007 at http://citeseer.ist.psu.edu/cache/papers/cs/25638/ftp.zSzzSzaxon.cs.byu.eduzSzpubzSzpaperszSzkemsley_92.pdf/kemsley92survery.pdf.

Kimura, K., et al., 1992, Association-based natural language processing with neural networks, in proceedings of the 7th annual meeting of the Association of Computational Linguistics, pp. 223-231.

Knudsen, J., Session Handling in MIDP, Jan. 2002, retrieved from http://developers.sun.com/mobility/midp/articles/sessions/ on Jul. 25, 2008, 7 pages.

Lewis, J., et al., SoftBridge: An Architecture for Building IP-Based Bridges Over the Digital Divide, Proceedings of the South African Telecommunications Networks & Applications Conference (SATNAC 2002), Drakensberg, South Africa, 5 pages.

Marshall, J., HTTP Made Really Easy, Aug. 15, 1997, retrieved from http://www.jmarshall.com/easy/http/ on Jul. 25, 2008, 15 pages.

Thomae, M., et al., Hierarchical Language Models for One-Stage Speech Interpretation, in INTERSPEECH, 2005, pp. 3425-3428.

Transl8it! translation engine, publicly available on http://www.transl8it.com since May 30, 2002. Retrieved on Oct. 26, 2007, 6 pages.

vBulletin Community Forum, thread posted on Mar. 5, 2004, retrieved Oct. 26, 2007 from http://www.vbulletin.com/forum/showthread.php'it-Pov'Zc, 1 page.

\* cited by examiner

400

| That man | | in here | | is a | | serial | | killer. | |
|---|---|---|---|---|---|---|---|---|---|

| that man | 45% | engineer | 35% | is a | 34% | cereal | 32% | filler | 52% |
|---|---|---|---|---|---|---|---|---|---|
| batman | 21% | engine ear | 23% | was a | 31% | serial | 31% | killer | 15% |
| hat man | 13% | in here | 12% | was uh | 26% | see real | 20% | biller | 14% |
| | | in ear | 11% | | | surreal | 12% | fuller | 10% |

*FIG. 5*

```
POST /Yap/Login HTTP/1.1
Host: www.icynine.com:8080
User-Agent:  Motorola-V3m Obigo/Q04C1 MMP/2.0 Profile/MIDP-2.0
Accept: application/xhtml+xml,text/html;q=0.9,text/plain;q=0.8,image/png,*/*;q=0.5
Accept-Language: en-us,en;q=0.5
Accept-Encoding: gzip,deflate
Accept-Charset: ISO-8859-1,utf-8;q=0.7,*;q=0.7
Yap-Phone-Number: 15615551234
Yap-User-ID: 1143
Yap-Version: 1.0.3
Yap-Audio-Record: amr
Yap-Audio-Play: amr
Connection: close
```

*FIG. 14*

Login/Login HEADER

| Request Headers | Request Body | Response Body |
|---|---|---|
| User-Agent | N/A | YAP URL |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |

*FIG. 15*

Yap/Login HEADER

| Request Headers | Request Body | Response Body |
|---|---|---|
| User-Agent | N/A | YAP SessionId |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |

*FIG. 16*

SUBMIT HEADER

| Request Headers | Request Body | Response Body |
|---|---|---|
| User-Agent | Binary Audio Data | Submit Receipt |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |
| Yap-Filter-Set | | |
| Yap-ASR-Engine (opt) | | |
| Yap-Return-Cells | | |
| Yap-Return-TTS | | |
| Yap-Content-Type | | |
| Yap-Content-Length | | |

Binary Data Field

*FIG. 17*

RESULTS HEADER

| Request Headers | Request Body | Response Body |
|---|---|---|
| User-Agent | N/A | Results Object |
| Content-Language | | |
| Connection | | |
| Yap-Company-ID | | |
| Yap-Product-ID | | |
| Yap-User-ID | | |
| Yap-Speaker-ID | | |
| Yap-Version | | |
| Yap-Password | | |
| Yap-Results-Receipt | | |
| Yap-Results-Timeout | | |

*FIG. 18*

Returns: an XML Hierarchy containing

- result—the body of result xml
- result-type
- result-code
- result-code-description
- result-text
- result-is-silence
- result-details
- result-conf
- lattice

*FIG. 19*

TTS HEADER

| Request Headers | Request Body | Response Body |
|---|---|---|
| User-Agent | N/A | TTS Binary Audio Data |
| Content-Language | | |
| Yap-Company-ID | | |
| Yap-Product-ID | | |
| Yap-User-ID | | |
| Yap-Speaker-ID | | |
| Yap-Version | | |
| Yap-Audio-Play | | |
| Yap-Audio-Record | | |
| Yap-Password | | |
| Yap-TTS-String | | |
| Yap-TTS-Voice | | |

*FIG. 20*

CORRECT HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |
| Yap-Results-Receipt | | |
| Yap-Correction | | |

*FIG. 21*

PING HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |

*FIG. 22*

DEBUG HEADER

| Request Headers | Request Body | Response Body |
|---|---|---|
| User-Agent | N/A | N/A |
| Content-Language | | |
| Yap-Phone-Number | | |
| Yap-User-ID | | |
| Yap-Version | | |
| Yap-Debug-Msg | | |

*FIG. 23*

CORRECTIVE FEEDBACK LOOP FOR AUTOMATED SPEECH RECOGNITION

I. CROSS-REFERENCE TO RELATED APPLICATIONS

This application is a continuation of U.S. patent application Ser. No. 14/341,054, filed Jul. 25, 2014, and is a continuation of U.S. patent application Ser. No. 13/621,189, filed Sep. 15, 2012, which issued as U.S. Pat. No. 8,793,122 on Jul. 29, 2014, which is a continuation of U.S. application Ser. No. 12/407,502, filed Mar. 19, 2009, which issued as U.S. Pat. No. 8,352,264 on Jan. 8, 2013, and is a nonprovisional application of, and claims priority under 35 U.S.C. § 119(e) to, each of the following:

(1) U.S. provisional patent application Ser. No. 61/038,048, filed Mar. 19, 2008 and titled "CORRECTIVE FEEDBACK LOOP FOR AUTOMATED SPEECH RECOGNITION;" and (2) U.S. provisional patent application Ser. No. 61/041,219, filed Mar. 31, 2008 and titled "USE OF METADATA TO POST PROCESS SPEECH RECOGNITION OUTPUT."

Each of the foregoing applications from which priority is claimed is hereby incorporated herein by reference in its entirety.

Additionally, U.S. nonprovisional patent application Ser. No. 11/697,074, filed Apr. 5, 2007 and published as U.S. Patent Application Publication No. US 2007/0239837, is incorporated herein by reference, and each of the following patent applications, and any corresponding patent application publications thereof, are incorporated herein by reference:

(1) U.S. nonprovisional patent application Ser. No. 12/197,213, filed Aug. 22, 2008 and titled "CONTINUOUS SPEECH TRANSCRIPTION PERFORMANCE INDICATION;"

(2) U.S. nonprovisional patent application Ser. No. 12/197,227, filed Aug. 22, 2008 and titled "TRANSCRIBING AND MATCHING MOBILE DEVICE UTTERANCES TO KEYWORDS TAKEN FROM MOBILE DEVICE MESSAGES AND ASSOCIATED WITH WEB ADDRESSES;"

(3) U.S. provisional patent application 61/091,330, filed Aug. 22, 2008 and titled "METHODS, APPARATUSES, AND SYSTEMS FOR PROVIDING TIMELY USER CUES PERTAINING TO SPEECH RECOGNITION;"

(4) U.S. nonprovisional patent application Ser. No. 12/198,112, filed Aug. 25, 2008 and titled "FILTERING TRANSCRIPTIONS OF UTTERANCES;"

(5) U.S. nonprovisional patent application Ser. No. 12/198,116, filed Aug. 25, 2008 and titled "FACILITATING PRESENTATION BY MOBILE DEVICE OF ADDITIONAL CONTENT FOR A WORD OR PHRASE UPON UTTERANCE THEREOF;"

(6) U.S. nonprovisional patent application Ser. No. 12/212,644, filed Sep. 17, 2008 and titled "METHODS AND SYSTEMS FOR DYNAMICALLY UPDATING WEB SERVICE PROFILE INFORMATION BY PARSING TRANSCRIBED MESSAGE STRINGS;"

(7) U.S. nonprovisional patent application Ser. No. 12/212,645, filed Sep. 17, 2008 and titled "FACILITATING PRESENTATION OF ADS RELATING TO WORDS OF A MESSAGE;" and (8) U.S. nonprovisional patent application Ser. No. 12/344,313, filed Dec. 26, 2008 and titled "VALIDATION OF MOBILE ADVERTISING FROM DERIVED INFORMATION."

(9) U.S. nonprovisional patent application Ser. No. 12/355,319, filed Jan. 16, 2009 and titled "USING A PHYSICAL PHENOMENON DETECTOR TO CONTROL OPERATION OF A SPEECH RECOGNITION ENGINE."

(10) U.S. nonprovisional patent application Ser. No. 12/400,723, filed Mar. 9, 2009 and titled "USE OF INTERMEDIATE SPEECH TRANSCRIPTION RESULTS IN EDITING FINAL SPEECH TRANSCRIPTION RESULTS."

Finally, the disclosure of provisional application 60/789,837 is contained in Appendix A attached hereto and, likewise, is incorporated herein in its entirety by reference and is intended to provide background and technical information with regard to the systems and environments of the inventions of the current provisional patent application. Similarly, the disclosure of the brochure of Appendix B is incorporated herein in its entirety by reference.

II. COPYRIGHT STATEMENT

All of the material in this patent document is subject to copyright protection under the copyright laws of the United States and of other countries. The copyright owner has no objection to the facsimile reproduction by anyone of the patent document or the patent disclosure, as it appears in the governmental files or records, but otherwise reserves all copyright rights whatsoever.

III. COMPUTER PROGRAM LISTING

Submitted concurrently herewith via the USPTO's electronic filing system, and incorporated herein by reference, is a computer program listing illustrating instructions, routines, and/or other contents of a computer program. The computer program listing is for 1 computer file(s) that represents an embodiment of the invention. The computer program listing includes file "source2.txt", created at 11:24:55 PM, Mar. 19, 2008, last modified at 11:24:56 PM, Mar. 19, 2008, having a file size of 5,913 bytes and a file size on the disk of 8,192 bytes. The computer program listing includes source code written in J2ME. The target hardware for this implementation is any hardware profile that can utilize an HTTP, HTTPS, or UDP protocol, or else has its own communication protocol.

IV. BACKGROUND OF THE PRESENT INVENTION

Automatic Speech Recognition ("ASR") systems are designed to convert an audio message containing speech into text. Recognition accuracy for a particular utterance can vary based on many factors including the audio fidelity of the recorded speech, correctness of the speaker's pronunciation, and the like. These factors contribute to continuously varying levels of recognition accuracy which can result in several possible transcriptions for a particular utterance.

Language models ("LMs"), which may include hierarchical language models ("HLMs"), statistical language models ("SLMs"), grammars, and the like, assign probabilities to a sequence of words by means of a probability distribution and try to capture the properties of a language so as to predict the next word in a speech sequence. They are used in conjunction with acoustic models ("AMs") to convert dictated words to transcribed text. The current state of the art with regard to both creating and updating AMs and LMs requires speech scientists to manually process hundreds to thousands of hours of spoken phrases or words to build AM and LM databases containing phonemes, all of the possible words within a spoken language, and their statistical interrelationships. ASR engines then compare an audio fingerprint against the AMs and LMs with the goal of obtaining a statistically significant match of the spoken audio to its textual representation. There is great expense in this process since a great deal of engineering time is required to generate and update AMs and LMs as languages continue to evolve and new words are continually coined and used in common lexicon.

Thus, a need exists for an automated, less labor intensive approach for generating and updating LMs for use in ASR systems.

V. SUMMARY OF THE PRESENT INVENTION

The present invention comprises an approach that simplifies the method by which LMs can be updated by putting the burden of updating LMs on the individual commercial users of the speech recognition platforms as they interact with a mobile client or web interface. As users interact with said mobile clients and web interfaces, they will see the results of their audio input returned as transcribed text. Any words that could have statistically been similar to other possibilities for that spoken word will appear highlighted and contain an n-best drop down list, for example. The user can then correct the phrase by choosing the intended word in the drop down list, manually editing and replacing the n-best results with the actual word, or speaking the correct form of the word again and performing another speech recognition query to generate the correct form of the word. Even without an n-best result, the user could still update or revise a given word. Once the original transcribed message is corrected, the user can then send the message for delivery to the intended recipient. In the use cases of a transcribed memo or voicemail, the corrected result is fed back into the speech recognition platform to modify core, application, or user centric models.

The corrected results are then either cached in the mobile client for upload to the ASR platform in a subsequent speech recognition transaction, thereby optimizing battery performance, or are sent back to the platform immediately once the user sends the message for delivery. Immediate delivery of the corrected form of the transaction occurs when the user is interacting with a web interface because small client battery performance would not be a concern. Once the corrected result is returned to the user, the corrected result is paired with the original outgoing result, and the LM is updated giving the correction a higher statistical probability than initially generated so that future queries will have a higher likelihood of generating the correct textual representation of the spoken word.

The present invention according to one aspect relates to a method for facilitating the updating of a language model, including receiving, at a client device, via a microphone, an audio message corresponding to speech of a user; communicating, to a first remote server, the audio message; receiving, at the client device, a result, transcribed at the first remote server using an automatic speech recognition system (ASR), from the audio message; receiving, at the client device from the user, an affirmation of the result; storing, at the client device, the result in association with an identifier corresponding to the audio message; and communicating, to a second remote server, the stored result together with the identifier.

In a feature of this aspect, the method further includes, subsequent to said step of communicating the stored result to the second remote server, updating, using the stored result and the identifier, a language model. In another feature of this aspect, the first remote server and the second remote server are the same remote server. In another feature of this aspect, the step of storing, at the client device, the result and identifier includes storing, at the client device, the result and identifier as a data stream. In yet another feature of this aspect, the step of communicating the stored result to the second remote server comprises communicating the data stream to the second remote server. In a further feature of this aspect, the identifier corresponding to the audio message includes the audio message. In still another feature of this aspect, the identifier corresponding to the audio message is configured to allow the remote server to locate the original audio stream. In another feature, the identifier includes a reference that allows the remote server to locate the audio message.

In still another feature, the method further has transcribing, at the first remote server using an automatic speech recognition system (ASR), a result from the audio message. In yet another feature of this aspect, the step of receiving, at the client device, a result comprises receiving, at the client device, a result and alternative result matrix transcribed, at the first remote server using an automatic speech recognition system (ASR), from the audio message. In a further feature of this aspect, the step of communicating, to the second remote server, the stored result together with the identifier comprises waiting, to communicate the stored result to the second remote server, until the next time the client device contacts the second remote server. In another feature of this aspect, the step of communicating, to the second remote server, the stored result together with the identifier comprises waiting for user instruction to communicate the stored result to the second remote server. In a further feature of this aspect, the step of communicating, to the second remote server, the stored result together with the identifier includes waiting, for an API call, to communicate the stored result to the second remote server.

The present invention according to another aspect relates to a method for facilitating the updating of a language model, including receiving, at a client device, via a microphone, an audio message corresponding to speech of a user; communicating, to a first remote server, the audio message; receiving, at the client device, a result and alternative result matrix transcribed, at the first remote server using an automatic speech recognition system (ASR), from the audio message; receiving, at the client device from the user, a manual correction of the result; storing, at the client device, the corrected result in association with an identifier corresponding to the audio message; and communicating, to a second remote server, the stored result together with the identifier.

In a feature of this aspect of the present invention, the step of receiving, at the client device, a manual correction includes receiving, at the client device, an affirmation of an alternative fragment result of the alternative result matrix. In another feature of this aspect, the step of receiving, at the client device, a manual correction includes receiving, at the client device, text input manually by the user using a keypad. In still another feature of this aspect, the step of receiving, at the client device, a manual correction includes receiving, at the client device, text input manually by the user using a touchscreen. In yet another feature of this aspect of the present invention, the identifier corresponding to the audio message comprises the audio message. In still a further feature of this aspect, the identifier corresponding to the audio message is configured to allow the remote server to locate the original audio message.

The present invention according to another aspect relates to a method for facilitating the updating of a language model, including receiving, at a client device, via a microphone, a first audio message corresponding to speech of a user; communicating, to a first remote server, the first audio message; receiving, at the client device, a first result, transcribed at the first remote server using an automatic speech recognition system (ASR), from the first audio message; receiving, at the client device from the user, a disapproval of the first result; receiving, at a client device, via a microphone, a second audio message corresponding to speech of the user; communicating, to the first remote server, the second audio message; receiving, at the client device, a result, transcribed at the first remote server using an automatic speech recognition system (ASR), from the second audio message; receiving, at the client device from the user, an affirmation of the second result; storing, at the client device, the second result in association with an identifier corresponding to the audio message; and communicating, to a second remote server, the stored result together with the identifier.

The present invention according to one aspect relates to a method for gathering data, including the step of returning a data stream from a client device to a remote server; wherein the data stream includes an affirmed text string previously transcribed from an audio stream via voice recognition software into a result; which result was then either affirmed by a user, or else corrected and then affirmed by a user; and wherein the data stream further includes an audio identifier.

In a feature of this aspect, the result includes a text string representing the most likely transcription of the audio stream. In another feature of this aspect, the result includes a matrix or set of matrices of possible transcription alternatives. In another feature of this aspect, the result includes both a text string representing the most likely transcription of the audio stream, and a matrix or set of matrices of possible transcription alternatives.

In a feature of this aspect, the audio identifier includes the entire prior audio stream that was transcribed. In another feature of this aspect, the audio identifier includes a portion of the prior audio stream that was transcribed. In another feature of this aspect, the audio identifier includes a reference that allows the remote server to locate the original audio stream. In another feature of this aspect, the audio identifier includes a reference that allows the remote server to locate a portion of the original audio stream. In another feature of this aspect, the audio identifier includes a reference that allows the remote server to locate information regarding the transcription of the original audio stream.

In a feature of this aspect, the data stream is transmitted via the world wide web. In a feature of this aspect, the data stream is transmitted via the internet. In a feature of this aspect, the data stream is transmitted via an intranet. In a feature of this aspect, the data stream is transmitted via conventional telephone lines. In a feature of this aspect, the data stream is transmitted wirelessly. In a feature of this aspect, the data stream is transmitted via a communication service provider of the client and/or the internet.

In a feature of this aspect, the client-server communication protocol is HTTP. In a feature of this aspect, the client-server communication protocol is HTTPS. Alternatively, in a feature of this aspect, the client-server communication uses direct socket connections via UDP.

In a feature of this aspect, the client device has a microphone, a speaker, and a display. In a feature of this aspect, the client device includes a keypad having a plurality of buttons. In a feature of this aspect, the client device is a cell phone. In a feature of this aspect, the client device is a PDA. In a feature of this aspect, the client device is a laptop computer. In a feature of this aspect, the client device is a desktop computer. In a feature of this aspect, the client device is an IP phone.

In a feature of this aspect, the method further includes the step of using the audio identifier and the affirmed text string to update the intelligence and accuracy of voice recognition software. In a feature of this aspect, the method further includes the step of saving the audio identifier and the affirmed text string for later use in updating voice recognition software. In a feature of this aspect, the method further includes the steps of determining whether or not the audio identifier includes the complete audio stream, locating the complete audio string using the audio identifier if it does not, and saving the audio stream and the affirmed text string for later use in updating voice recognition software.

In a feature of this aspect, the step of returning a data stream from the client device to the remote server is delayed until the next time the client device contacts the remote server with a transcription request. In a feature of this aspect, the step of returning a data stream from the client device to a remote server occurs as soon as the data stream is prepared.

The present invention according to another aspect relates to a method for returning data to a remote server, including the step of returning a data stream from a client device to a remote server; wherein the data stream includes an affirmed text string previously transcribed from an audio stream via voice recognition software into a result; which result was then either affirmed by a user, or else corrected and then affirmed by a user; and wherein the data stream further includes an audio identifier.

In a feature of this aspect, the result includes a text string representing the most likely transcription of the audio stream. In another feature of this aspect, the result includes a matrix or set of matrices of possible transcription alternatives. In another feature of this aspect, the result includes both a text string representing the most likely transcription of the audio stream, and a matrix or set of matrices of possible transcription alternatives.

In a feature of this aspect, the audio identifier includes the entire prior audio stream that was transcribed. In another feature of this aspect, the audio identifier includes a portion of the prior audio stream that was transcribed. In another feature of this aspect, the audio identifier includes a reference that allows the remote server to locate the original audio stream. In another feature of this aspect, the audio identifier includes a reference that allows the remote server to locate a portion of the original audio stream. In another feature of this aspect, the audio identifier includes a reference that allows the remote server to locate information regarding the transcription of the original audio stream.

In a feature of this aspect, the data stream is transmitted via the world wide web. In a feature of this aspect, the data stream is transmitted via the internet. In a feature of this aspect, the data stream is transmitted via an intranet. In a feature of this aspect, the data stream is transmitted via conventional telephone lines. In a feature of this aspect, the data stream is transmitted wirelessly. In a feature of this aspect, the data stream is transmitted via a communication service provider of the client and/or the internet.

In a feature of this aspect, the client-server communication protocol is HTTP. In a feature of this aspect, the client-server communication protocol is HTTPS. Alternatively, in a feature of this aspect, the client-server communication uses direct socket connections via UDP.

In a feature of this aspect, the client device has a microphone, a speaker, and a display. In a feature of this aspect, the client device includes a keypad having a plurality of buttons. In a feature of this aspect, the client device is a cell phone. In a feature of this aspect, the client device is a PDA. In a feature of this aspect, the client device is a laptop computer. In a feature of this aspect, the client device is a desktop computer. In a feature of this aspect, the client device is an IP phone.

In a feature of this aspect, the method further includes the step of using the audio identifier and the affirmed text string to update the intelligence and accuracy of voice recognition software. In a feature of this aspect, the method further includes the step of saving the audio identifier and the affirmed text string for later use in updating voice recognition software. In a feature of this aspect, the method further includes the steps of determining whether or not the audio identifier includes the complete audio stream, locating the complete audio string using the audio identifier if it does not, and saving the audio stream and the affirmed text string for later use in updating voice recognition software.

In a feature of this aspect, the step of returning a data stream from the client device to the remote server is delayed until the next time the client device contacts the remote server with a transcription request. In a feature of this aspect, the step of returning a data stream from the client device to a remote server occurs as soon as the data stream is prepared.

The present invention according to another aspect relates to a system of returning data to a remote server, comprising a client device with computer readable instructions stored in memory; the instructions including an instruction to return a data stream to a remote server; wherein the data stream includes an affirmed text string previously transcribed from an audio stream via voice recognition software into a result; which result was then either affirmed by a user, or else corrected and then affirmed by a user; and wherein the data stream further includes an audio identifier.

In a feature of this aspect, the result includes a text string representing the most likely transcription of the audio stream. In another feature of this aspect, the result includes a matrix or set of matrices of possible transcription alternatives. In another feature of this aspect, the result includes both a text string representing the most likely transcription of the audio stream, and a matrix or set of matrices of possible transcription alternatives.

In a feature of this aspect, the audio identifier includes the entire audio stream that was previously transcribed. In another feature of this aspect, the audio identifier includes a portion of the audio stream that was previously transcribed. In another feature of this aspect, the audio identifier includes a reference that allows the remote server to locate the original audio stream. In another feature of this aspect, the audio identifier includes a reference that allows the remote server to locate a portion of the original audio stream. In another feature of this aspect, the audio identifier includes a reference that allows the remote server to locate information regarding the transcription of the original audio stream.

In a feature of this aspect, the data stream is transmitted via the world wide web. In a feature of this aspect, the data stream is transmitted via the internet. In a feature of this aspect, the data stream is transmitted via an intranet. In a feature of this aspect, the data stream is transmitted via conventional telephone lines. In a feature of this aspect, the data stream is transmitted wirelessly. In a feature of this aspect, the data stream is transmitted via a communication service provider of the client and/or the internet.

In a feature of this aspect, the client-server communication protocol is HTTP. In a feature of this aspect, the client-server communication protocol is HTTPS. Alternatively, in a feature of this aspect, the client-server communication uses direct socket connections via UDP.

In a feature of this aspect, the client device has a microphone, a speaker, and a display. In a feature of this aspect, the client device includes a keypad having a plurality of buttons. In a feature of this aspect, the client device is a cell phone. In a feature of this aspect, the client device is a PDA. In a feature of this aspect, the client device is a laptop computer. In a feature of this aspect, the client device is a desktop computer. In a feature of this aspect, the client device is an IP phone.

In a feature of this aspect, the instructions further include an instruction not to return the data stream to the remote server until another transcription request is initiated. In another feature of this aspect, the instructions further include an instruction to return the data stream to the remote server as soon as the data stream is prepared.

The present invention according to another aspect relates to a system of gathering data, comprising a remote server with computer readable instructions stored in memory; the instructions including an instruction to await a data stream from at least one client device; wherein the data stream includes an affirmed text string previously transcribed from an audio stream via voice recognition software into a result; which result was then either affirmed by a user, or else corrected and then affirmed by a user; and wherein the data stream further includes an audio identifier.

In a feature of this aspect, the result includes a text string representing the most likely transcription of the audio stream. In another feature of this aspect, the result includes a matrix or set of matrices of possible transcription alternatives. In another feature of this aspect, the result includes both a text string representing the most likely transcription of the audio stream, and a matrix or set of matrices of possible transcription alternatives.

In a feature of this aspect, the audio identifier includes the entire audio stream that was previously transcribed. In another feature of this aspect, the audio identifier includes a portion of the audio stream that was previously transcribed. In another feature of this aspect, the audio identifier includes a reference that allows the remote server to locate the original audio stream. In another feature of this aspect, the audio identifier includes a reference that allows the remote server to locate a portion of the original audio stream. In another feature of this aspect, the audio identifier includes a reference that allows the remote server to locate information regarding the transcription of the original audio stream.

In a feature of this aspect, the data stream is transmitted via the world wide web. In a feature of this aspect, the data stream is transmitted via the internet. In a feature of this aspect, the data stream is transmitted via an intranet. In a feature of this aspect, the data stream is transmitted via conventional telephone lines. In a feature of this aspect, the data stream is transmitted wirelessly. In a feature of this aspect, the data stream is transmitted via a communication service provider of the client and/or the internet.

In a feature of this aspect, the client-server communication protocol is HTTP. In a feature of this aspect, the client-server communication protocol is HTTPS. Alternatively, in a feature of this aspect, the client-server communication uses direct socket connections via UDP.

In a feature of this aspect, the client device has a microphone, a speaker, and a display. In a feature of this aspect, the client device includes a keypad having a plurality of buttons. In a feature of this aspect, the client device is a cell phone. In a feature of this aspect, the client device is a PDA. In a feature of this aspect, the client device is a laptop computer. In a feature of this aspect, the client device is a desktop computer. In a feature of this aspect, the client device is an IP phone.

In a feature of this aspect, the instructions further include an instruction to use the audio identifier and the affirmed text string to update the intelligence and accuracy of voice recognition software. In a feature of this aspect, the instructions further include an instruction to save the audio identifier and the affirmed text string for later use in updating voice recognition software. In a feature of this aspect, the instructions further include an instruction to determine whether or not the audio identifier includes the complete audio stream, locate the complete audio string using the audio identifier if it does not, and save the audio stream and the affirmed text string for later use in updating voice recognition software.

In a feature of this aspect, the instructions further include an instruction not to return the data stream to the remote server until another transcription request is initiated. In another feature of this aspect, the instructions further include an instruction to return the data stream to the remote server as soon as the data stream is prepared.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

VI. BRIEF DESCRIPTION OF THE DRAWINGS

Further aspects, features, embodiments, and advantages of the present invention will become apparent from the following detailed description with reference to the drawings, wherein:

FIG. 5 is a table listing various possible transcription results for each fragment or portion of the utterance;

FIG. 14 is a typical header section of an HTTP request from the client in the commercial implementation;

FIG. 15 illustrates exemplary protocol details for a request for a location of a login server and a subsequent response;

FIG. 16 illustrates exemplary protocol details for a login request and a subsequent response;

FIG. 17 illustrates exemplary protocol details for a submit request and a subsequent response;

FIG. 18 illustrates exemplary protocol details for a results request and a subsequent response;

FIG. 19 illustrates exemplary protocol details for an XML hierarchy returned in response to a results request;

FIG. 20 illustrates exemplary protocol details for a text to speech request and a subsequent response;

FIG. 21 illustrates exemplary protocol details for a correct request;

FIG. 22 illustrates exemplary protocol details for a ping request; and

FIG. 23 illustrates exemplary protocol details for a debug request.

VII. DETAILED DESCRIPTION OF THE PREFERRED EMBODIMENTS

Figure 1:
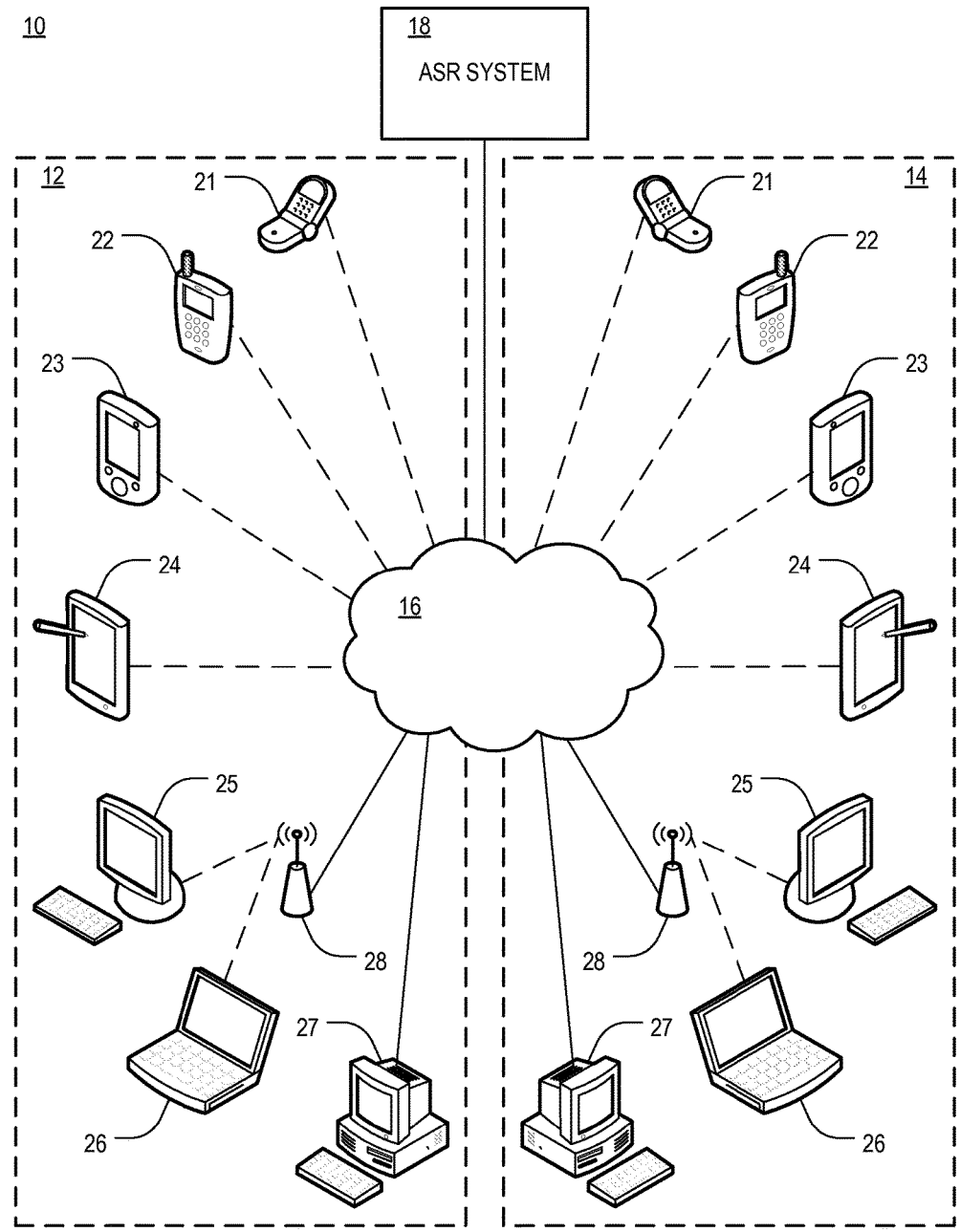
FIG. 1 is a block diagram of a communication system in accordance with a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is it to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, the preferred embodiments of the present invention are next described. The following description of the preferred embodiment(s) is merely exemplary in nature and is in no way intended to limit the invention, its application, or uses.

FIG. 1 is a block diagram of a communication system 10 in accordance with a preferred embodiment of the present invention. As shown therein, the communication system 10 includes at least one transmitting device 12 and at least one receiving device 14, one or more network systems 16 for connecting the transmitting device 12 to the receiving device 14, and an automatic speech recognition ("ASR") system 18, including an ASR engine. Transmitting and receiving devices 12,14 may include cell phones 21, smart phones 22, PDAs 23, tablet notebooks 24, various desktop and laptop computers 25,26,27, and the like, one or more of which may be a handheld device. One or more of the devices 12,14, such as the illustrated iMac and laptop computers 25,26, may connect to the network systems 16 via a wireless access point 28. The various transmitting and receiving devices 12,14 (one or both types of which being sometimes referred to herein as "client devices") may be of any conventional design and manufacture.

Figure 2:
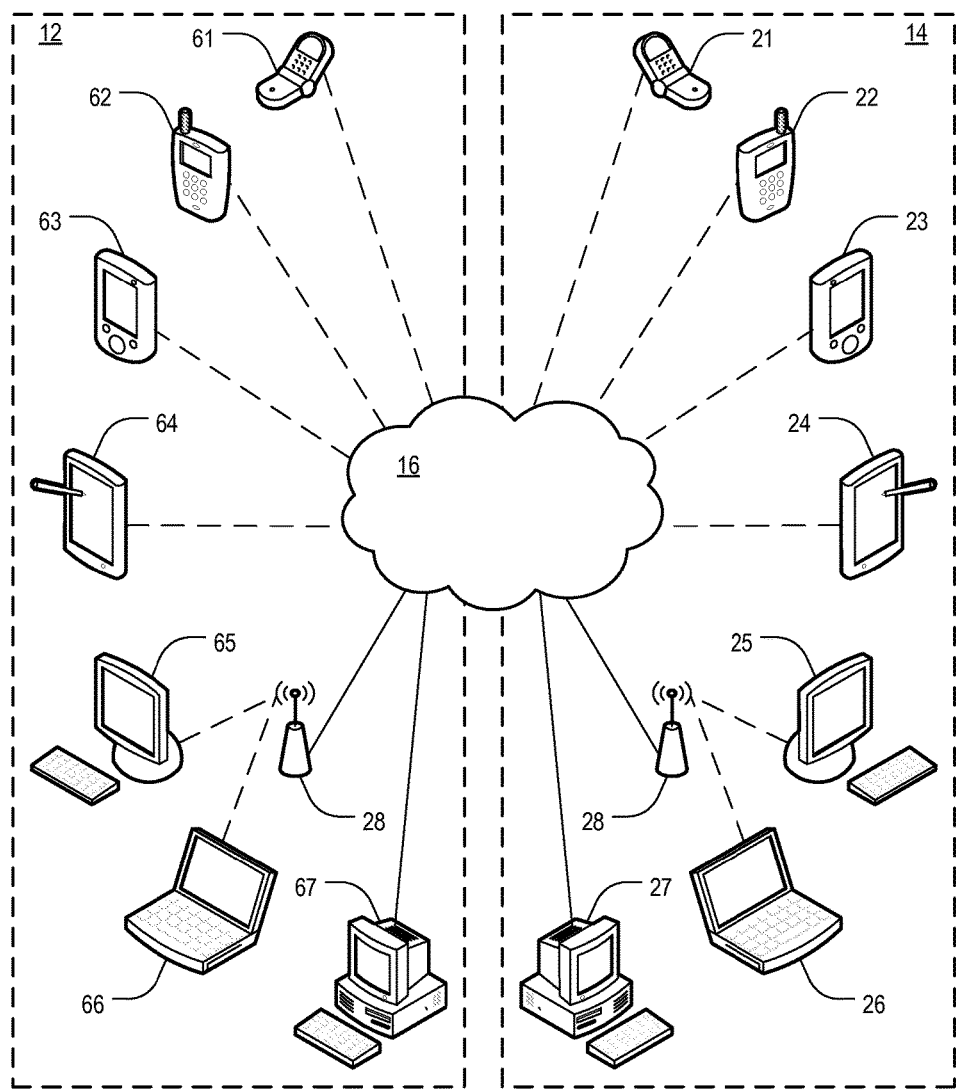
FIG. 2 is a block diagram of a communication system in accordance with another preferred embodiment of the present invention.

FIG. 2 is a block diagram of a communication system 60 in accordance with another preferred embodiment of the present invention. This system 60 is similar to the system 10 of FIG. 1, except that the ASR system 18 of FIG. 1 has been omitted and the ASR engine has instead been incorporated into the various transmitting devices 12, including cell phones 61, smart phones 62, PDAs 63, tablet notebooks 64, various desktop and laptop computers 65,66,67, and the like.

It will be appreciated that the illustrations of FIGS. 1 and 2 are intended primarily to provide context in which the inventive features of the present invention may be placed. A more complete explanation of one or more system architectures implementing such systems is provided, elsewhere herein, in the incorporated applications and/or in the incorporated Appendices attached hereto. Furthermore, in the context of text messaging, the communication systems 10,60 each preferably includes, inter alia, a telecommunications network. In the context of instant messaging, the communications systems 10,60 each preferably includes, inter alia, the Internet.

Figure 3:
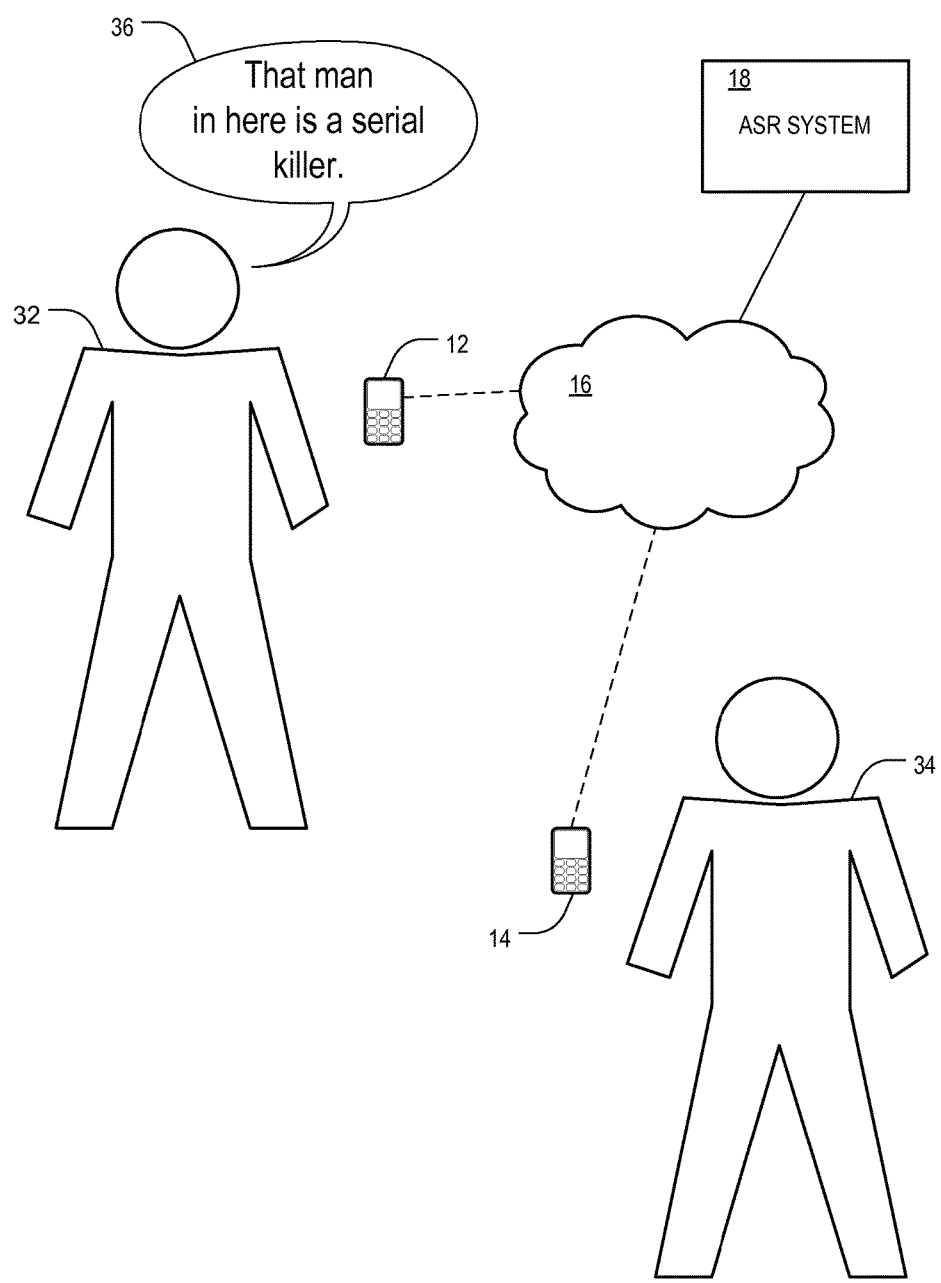
FIG. 3 is a block diagram illustrating communications between two users via a portion of the communication system of FIG. 1.

FIG. 3 is a block diagram illustrating communications between two users 32,34 via a portion of the communication system 10 of FIG. 1. As shown therein, a first user 32, sometimes referred to herein as a "transmitting user," is communicating with a second user 34, sometimes referred to herein as a "receiving user," by way of respective transmitting and receiving devices 12,14. More particularly, the transmitting user 32 uses his transmitting device 12 to initiate text messages that are transmitted to, and received by, the receiving user 34 via her receiving device 14. In the context of text messaging, the transmitting user 32 may send text messages, using his transmitting device 12, via SMS, and the receiving user 34 receives text messages, sent via SMS, on her receiving device 14. In the context of instant messaging, the transmitting user 32 may send instant messages via an IM client using his transmitting device 12, and the receiving user 34 receives instant messages on his receiving device 14, via an IM client, using his transmitting device 12, and the receiving user 34 receives instant messages, via an IM client, on her receiving device 14.

In either case, the first user 32 speaks an utterance 36 into the transmitting device 12, and the recorded speech audio is sent to the ASR system 18. In FIG. 3, the utterance 36 is "That man in here is a serial killer." The ASR engine in the ASR system 18 attempts to recognize and transcribe the speech into text.

In at least some embodiments, the transmitting user 32 in FIG. 3 may generate text messages by speaking into his transmitting device 12 and causing his utterances to be converted to text for communicating to the receiving device 14. One or more systems and methods for carrying out such a process are described, for example, in the aforementioned U.S. Patent Application Pub. No. US 2007/0239837, but are at least partially described herein. More particularly, FIG. 4 may be understood to be a block diagram of an exemplary implementation of the system 10 of FIG. 1. In this implementation, the transmitting device 12 is a mobile phone, the ASR system 18 is implemented in one or more backend servers 160, and the one or more network systems 16 include transceiver towers 130, one or more mobile communication service providers 140 (operating or joint or independent control) and the Internet 150. The backend server 160 is or may be placed in communication with the mobile phone 12 via the mobile communication service provider 140 and the Internet 150. The mobile phone has a microphone, a speaker and a display.

A first transceiver tower 130A is positioned between the mobile phone 12 (or the user 32 of the mobile phone 12) and the mobile communication service provider 140, for receiving an audio message (V1), a text message (T3) and/or a verified text message (V/T1) from one of the mobile phone 12 and the mobile communication service provider 140 and transmitting it (V2, T4, V/T2) to the other of the mobile phone 12 and the mobile communication service provider 140. A second transceiver tower 130B is positioned between the mobile communication service provider 140 and mobile devices 170, generally defined as receiving devices 14 equipped to communicate wirelessly via mobile communication service provider 140, for receiving a verified text message (V/T3) from the mobile communication service provider 140 and transmitting it (V5 and T5) to the mobile devices 170. In at least some embodiments, the mobile devices 170 are adapted for receiving a text message converted from an audio message created in the mobile phone 12. Additionally, in at least some embodiments, the mobile devices 170 are also capable of receiving an audio message from the mobile phone 12. The mobile devices 170 include, but are not limited to, a pager, a palm PC, a mobile phone, or the like.

The system 10 also includes software, as disclosed below in more detail, installed in the mobile phone 12 and the backend server 160 for causing the mobile phone 12 and/or the backend server 160 to perform the following functions. The first step is to initialize the mobile phone 12 to establish communication between the mobile phone 12 and the backend server 160, which includes initializing a desired application from the mobile phone 12 and logging into a user account in the backend server 160 from the mobile phone 12. Then, the user 32 presses and holds one of the buttons of the mobile phone 12 and speaks an utterance 36, thus generating an audio message, V1. At this stage, the audio message V1 is recorded in the mobile phone 12. By releasing the button, the recorded audio message V1 is sent to the backend server 160 through the mobile communication service provider 140.

Figure 4:
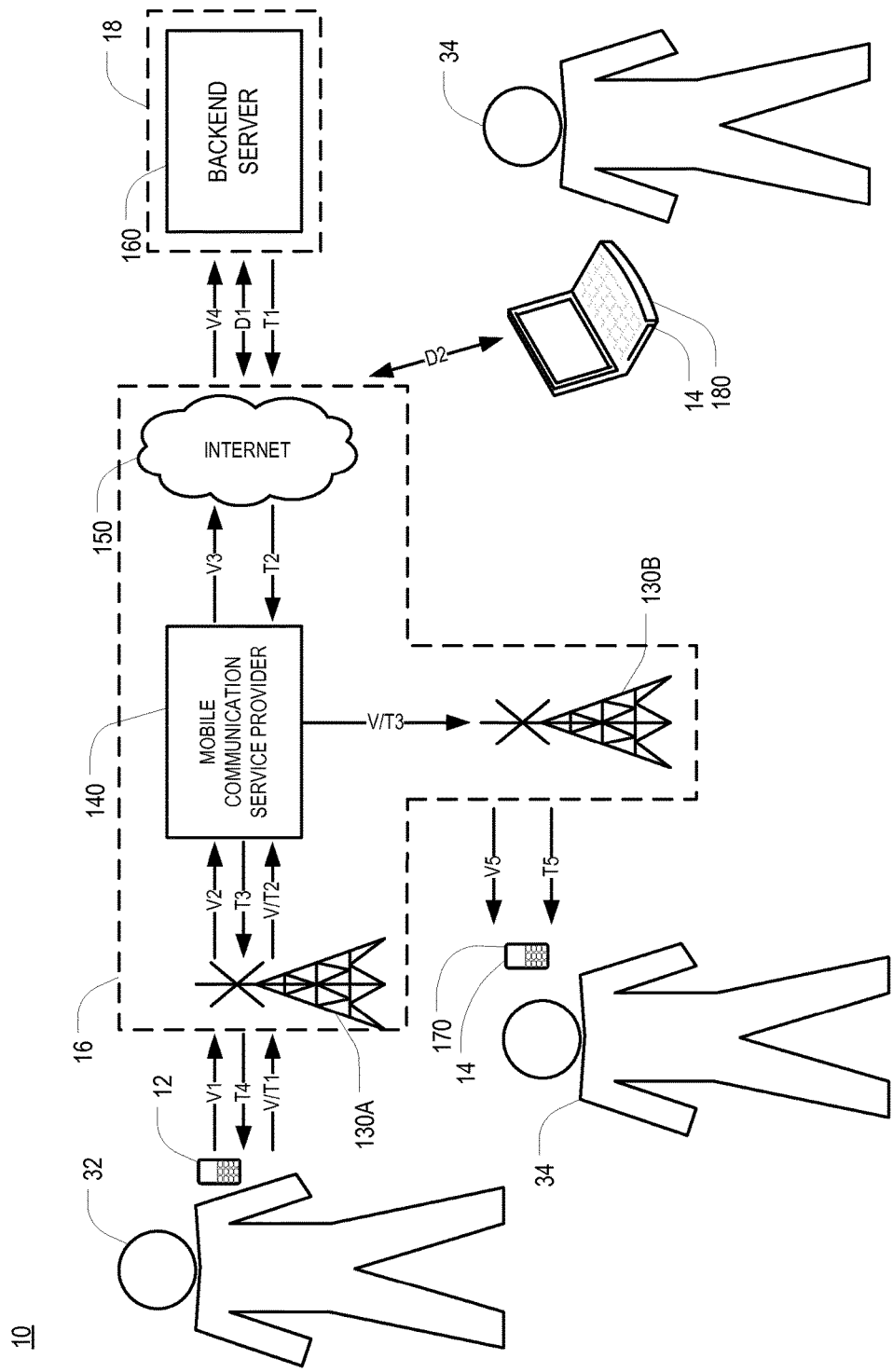
FIG. 4 is a block diagram of an exemplary implementation of the system of FIG. 1.

In the exemplary embodiment of the present invention as shown in FIG. 4, the recorded audio message V1 is first transmitted to the first transceiver tower 130A from the mobile phone 12. The first transceiver tower 130A outputs the audio message V1 into an audio message V2 that is, in turn, transmitted to the mobile communication service provider 140. Then the mobile communication service provider 140 outputs the audio message V2 into an audio message V3 and transmits it (V3) to the Internet 150. The Internet 150 outputs the audio message V3 into an audio message V4 and transmits it (V4) to the backend server 160. The content of all the audio messages V1-V4 is identical.

The backend server 160 then converts the audio message V4 into a text message, T1, and/or a digital signal, D1, in the backend server 160 by means of a speech recognition algorithm including a grammar algorithm and/or a transcription algorithm. The text message T1 and the digital signal D1 correspond to two different formats of the audio message V4. The text message T1 and/or the digital signal D1 are sent back to the Internet 150 that outputs them into a text message T2 and a digital signal D2, respectively.

The digital signal D2 is transmitted to a digital receiver 180, generally defined as a receiving device 14 equipped to communicate with the Internet and capable of receiving the digital signal D2. In at least some embodiments, the digital receiver 180 is adapted for receiving a digital signal converted from an audio message created in the mobile phone 12. Additionally, in at least some embodiments, the digital receiver 180 is also capable of receiving an audio message from the mobile phone 12. A conventional computer is one example of a digital receiver 180. In this context, a digital signal D2 may represent, for example, an email or instant message.

It should be understood that, depending upon the configuration of the backend server 160 and software installed on the mobile phone 12, and potentially based upon the system set up or preferences of the user 32, the digital signal D2 can either be transmitted directly from the backend server 160 or it can be provided back to the mobile phone 12 for review and acceptance by the user 32 before it is sent on to the digital receiver 180.

The text message T2 is sent to the mobile communication service provider 140 that outputs it (T2) into a text message T3. The output text message T3 is then transmitted to the first transceiver tower 130A. The first transceiver tower 130A then transmits it (T3) to the mobile phone 12 in the form of a text message T4. It is noted that the substantive content of all the text messages T1-T4 may be identical, which are the corresponding text form of the audio messages V1-V4.

Upon receiving the text message T4, the user 32 verifies it and sends the verified text message V/T1 to the first transceiver tower 130A that in turn, transmits it to the mobile communication service provider 140 in the form of a verified text V/T2. The verified text V/T2 is transmitted to the second transceiver tower 130B in the form of a verified text V/T3 from the mobile communication service provider 140. Then, the transceiver tower 130B transmits the verified text V/T3 to the mobile devices 170.

In at least one implementation, the audio message is simultaneously transmitted to the backend server 160 from the mobile phone 12, when the user 32 speaks to the mobile phone 12. In this circumstance, it is preferred that no audio message is recorded in the mobile phone 12, although it is possible that an audio message could be both transmitted and recorded.

Such a system 10 may be utilized to convert an audio message into a text message. In at least one implementation, this may be accomplished by first initializing a transmitting device so that the transmitting device is capable of communicating with a backend server 160. Second, a user 32 speaks to or into the client device 12 so as to create a stream of an audio message. The audio message can be recorded and then transmitted to the backend server 160, or the audio message can be simultaneously transmitted to the backend server 160 through a client-server communication protocol. Streaming may be accomplished according to processes described elsewhere herein and, in particular, in FIG. 4, and accompanying text, of the aforementioned U.S. Patent Application Pub. No. US 2007/0239837. The transmitted audio message is converted into the text message in the backend server 160. The converted text message is then sent back to the client device 12. Upon the user's verification, the converted text message is forwarded to one or more recipients 34 and their respective receiving devices 14, where the converted text message may be displayed on the device 14. Incoming messages may be handled, for example, according to processes described elsewhere herein and, in particular, in FIG. 2, and accompanying text, of the aforementioned U.S. Patent Application Pub. No. US 2007/0239837.

Still further, in at least one implementation, one or both types of client device 12,14 may be located through a global positioning system (GPS); and listing locations, proximate to the position of the client device 12,14, of a target of interest may be presented in the converted text message.

Furthermore, in converting speech to text, speech transcription performance indications may be provided to the receiving user 34 in accordance with the disclosure of U.S. patent application Ser. No. 12/197,213, filed Aug. 22, 2008 and entitled "CONTINUOUS SPEECH TRANSCRIPTION PERFORMANCE INDICATION," which, together with any corresponding patent application publications thereof, is hereby incorporated herein by reference.

Additionally, in the context of SMS messaging, the ASR engine preferably makes use of both statistical language models (SLMs) for returning results from the audio data, and finite grammars used to post-process the text results, in accordance with the disclosure of U.S. patent application Ser. No. 12/198,112, filed Aug. 25, 2008 and entitled "FILTERING TRANSCRIPTIONS OF UTTERANCES," which, together with any corresponding patent application publications thereof, is incorporated herein by reference. This is believed to result in text messages that are formatted in a way that looks more typical of how a human would have typed the text message using a mobile device.

Speech recognition output may be post-processed using metadata, available to the user, in accordance with the disclosure of U.S. Patent Application No. 61/041,219, filed Mar. 31, 2008 and entitled "USE OF METADATA TO POST PROCESS SPEECH RECOGNITION OUTPUT," a copy of which is attached hereto as Appendix C and is incorporated herein by reference.

The ASR system 18 transmits the text back to the originating device 12. Once this device 12 receives the transcribed text, it preferably displays the message to the transmitting user 32 for verification and editing as necessary, and upon approval by the user, the text may be formatted into a text message or instant message that may be transmitted to a destination communication device such as the receiving device 14 described previously. If not already selected or pre-set, the user 32 selects a desired phone number or other destination address stored in memory on the transmitting device 12 or in a remote server or inputs a number or other address via one or more input elements, and an outgoing message signal corresponding to the number or address is transmitted. Voice commands may be utilized to control such functionality, and such a process may be implemented, for example, in accordance with the disclosure of U.S. patent application Ser. No. 12/355,319, filed Jan. 16, 2009 and entitled "USING A PHYSICAL PHENOMENON DETECTOR TO CONTROL OPERATION OF A SPEECH RECOGNITION ENGINE," which, together with any corresponding patent application publications thereof, is incorporated herein by reference.

FIG. 5 is a table 400 listing various possible transcription results for each fragment or portion of the utterance 36. More particularly, "that man," "batman" and "hat man" are listed as possible transcription results for the utterance fragment "That man;" "engineer," "engine ear," "in here" and "ear" are presented as possible transcription results for the utterance fragment "in here;" "is a," "was a" and "was uh" are listed as possible transcription results for the utterance fragment "is a;" "cereal," "serial," "see real" and "surreal" are listed as a possible transcription results for the utterance fragment "serial;" and "filler," "killer," "biller" and "fuller" are listed as possible transcription results for the utterance fragment "killer." It will be appreciated that each fragment is presented in conjunction with a confidence level, expressed as a percentage, representing the calculated relative confidence the ASR system 18 has that that fragment is accurate. In FIG. 5, the possible transcription results for each fragment or portion of the utterance 36 are presented in descending order of confidence. It will be further appreciated that only those results in which the confidence level is 10% or above are shown in the table 400, but that many other possible results may be considered as well.

When transcription is complete, the fragment results having the highest confidence levels are presented to the user 32 in the order in which the utterance fragments were spoken. In particular, for each fragment of the utterance, the fragment result having the highest confidence level is preferably presented to the user 32 such that the overall transcribed utterance represents the most likely transcription result as measured by the confidence levels of the respective fragment results.

Figure 6A:
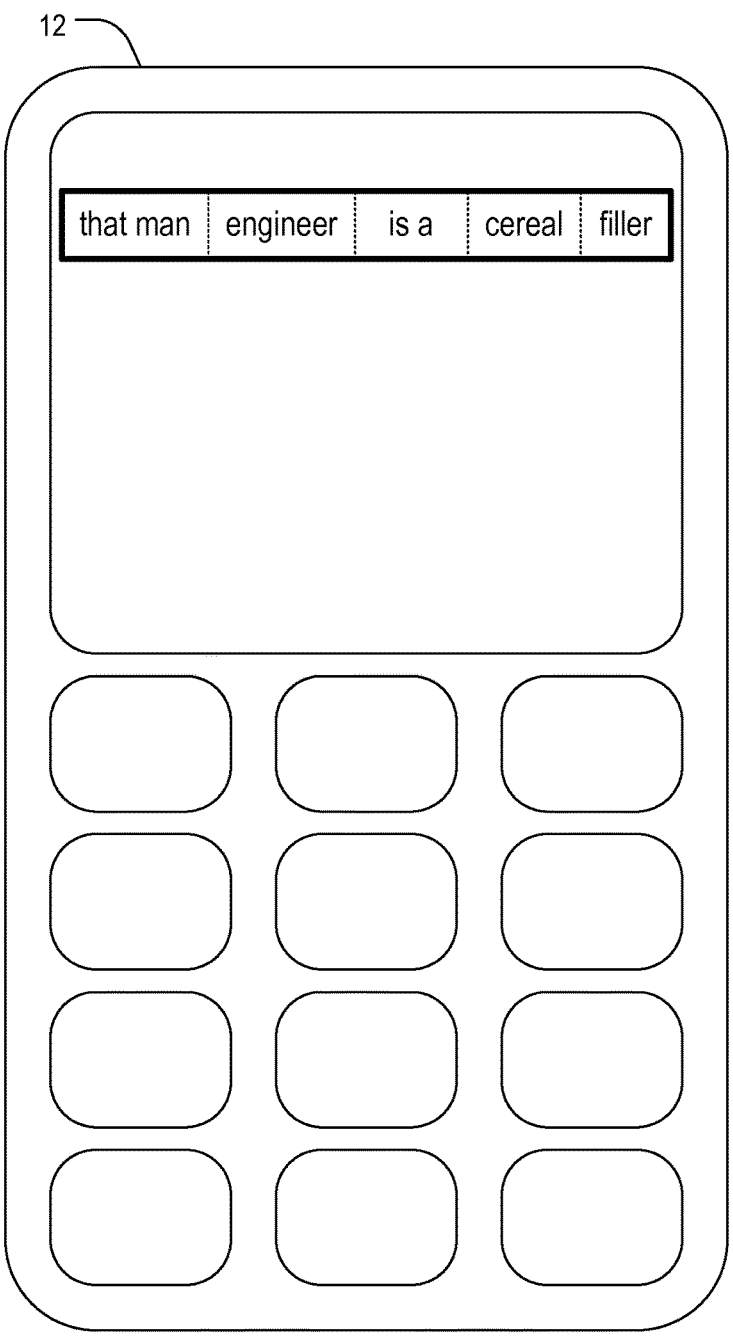
FIGS. 6A-6E are graphical depictions, on a transmitting device, of the transcription of the utterance of FIG. 3, illustrating the selection and replacement of one of the fragment results reached by the ASR engine for one portion of the utterance.

If the transcribed utterance thus presented is not the one desired by the user 32, the user 32 may then take action to edit or correct the result. For example, the user 32 may choose to edit one or more of the fragment results. FIGS. 6A-6E are graphical depictions, on a transmitting device 12, of the transcription of the utterance 36 of FIG. 3, illustrating the selection and replacement of one of the fragment results reached by the ASR engine for one portion of the utterance 36. In FIGS. 6A-6E, it all of the fragment results having a confidence level of 10% or more are available to the user 32 for selection and replacement of the corresponding portion of the transcribed utterance. In FIG. 6A, the complete transcribed utterance in which the ASR engine has the greatest confidence is first presented to the user 32. It will be appreciated that this proposed transcription is not accurate, in that the ASR engine has returned "engineer" as the most likely fragment result for "in here," "cereal" as the most likely fragment result for "serial," and "filler" as the most likely fragment result for "killer."

Figure 6B:
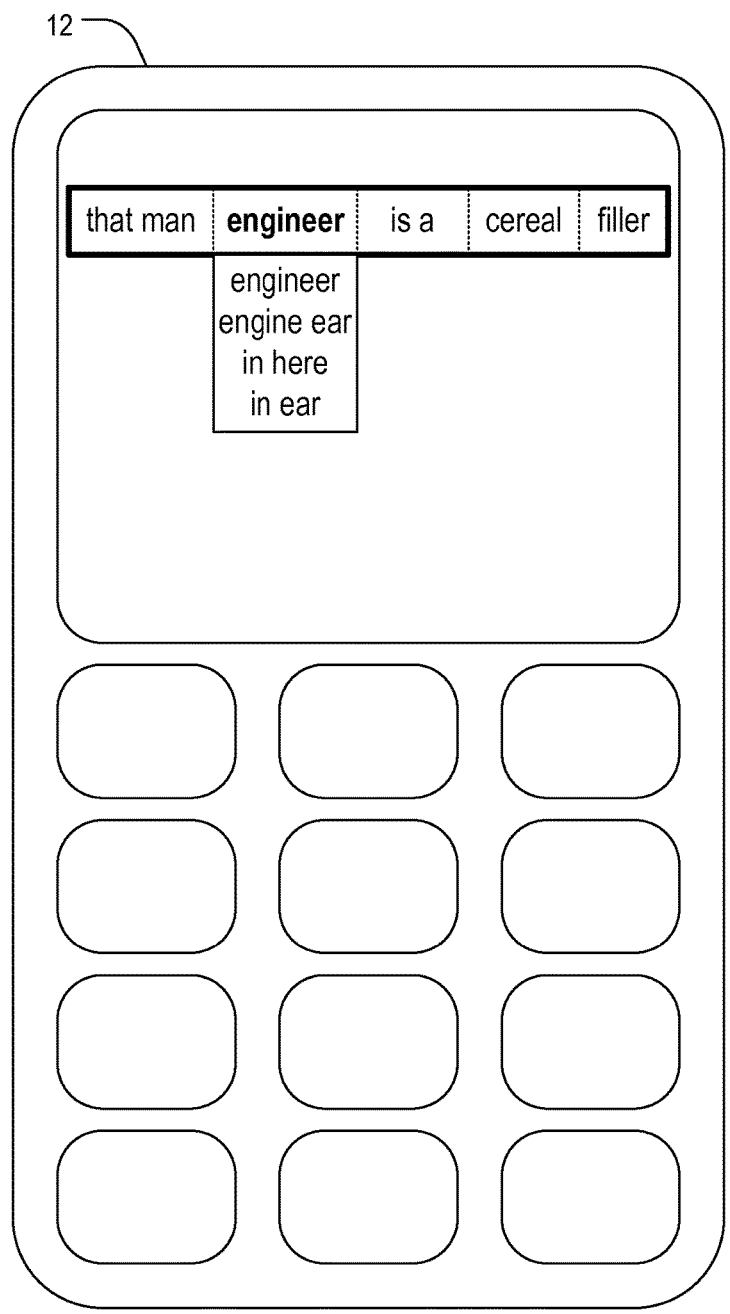
Figure 6C:
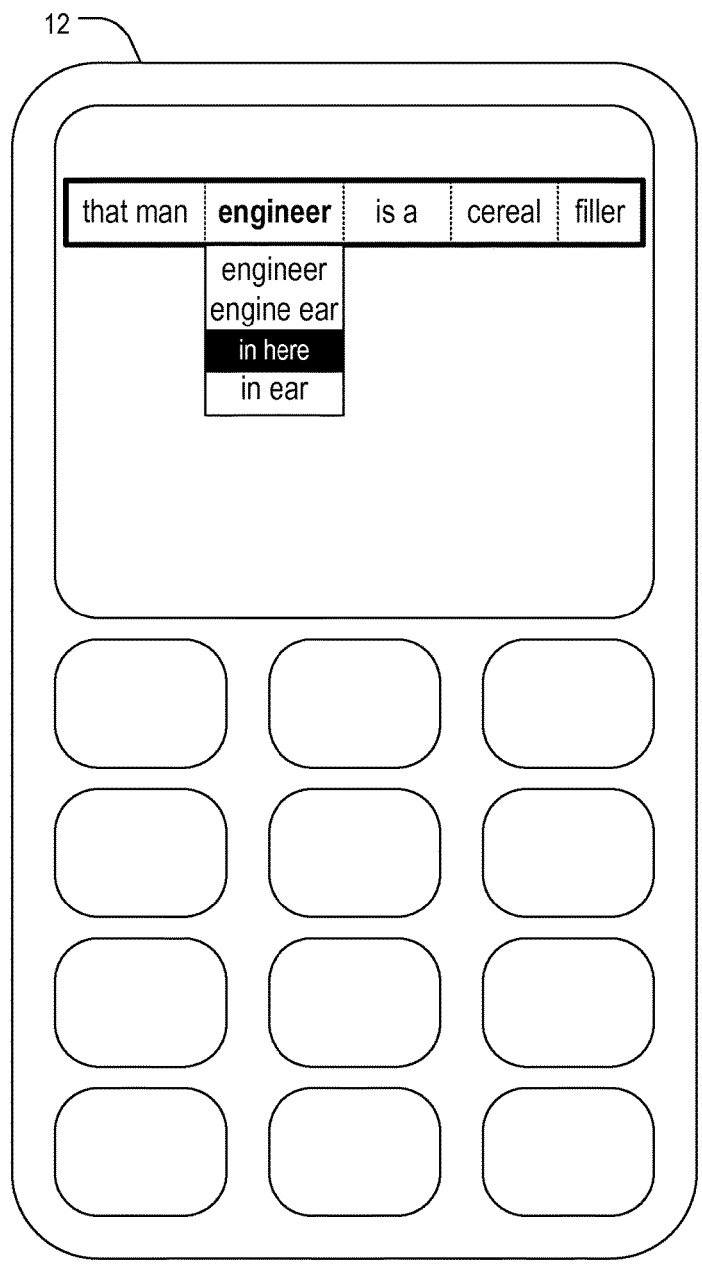
Figure 6D:
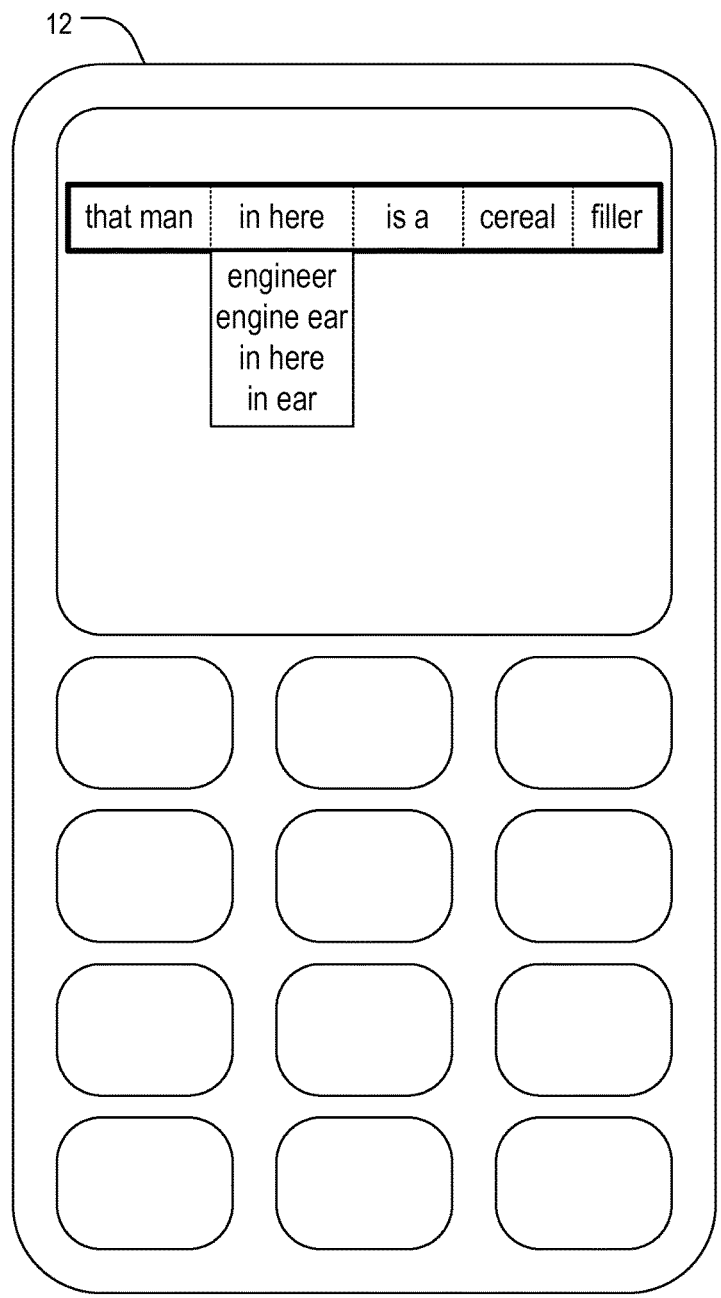
Figure 6E:
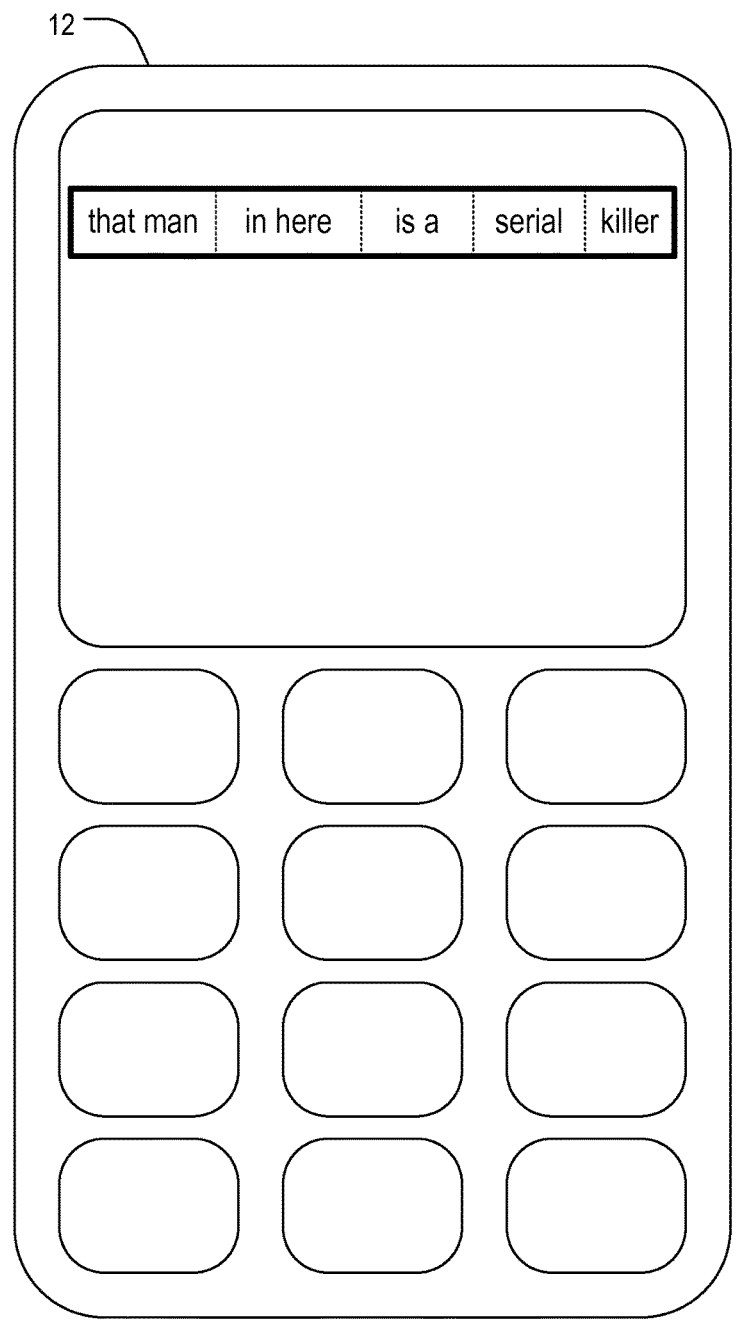

In FIG. 6B, the user 32 begins correcting the transcribed utterance by selecting one of the fragment results for editing or correction. In particular, the user 32 has selected the utterance fragment with the final result "engineer" for replacement, thereby causing a drop-down menu or list to appear. Referring again to FIG. 5, it is to be understood that the items in the drop-down list in FIG. 6B are preferably the fragment results for that portion of the utterance 36 that had confidence levels of 10% or more. In FIG. 6C, the user 32 has selected one of those alternative fragment results ("in here") to replace the one returned by the ASR engine. In FIG. 6D, the user 32 has gone ahead and replaced "engineer" with "in here," producing the edited final result of "that man in here is a cereal filler." By further using the same process to replace the final result "cereal" with "serial" and the final result "filler" with "killer," the user 32 is able to reach the intended result of "that man in here is a serial killer," as shown in FIG. 6E. Selection may be accomplished in any conventional manner, including manipulation of input keys, buttons or the like on the device 12, use of a stylus or other external tool, voice activation, or the like.

Figure 7:
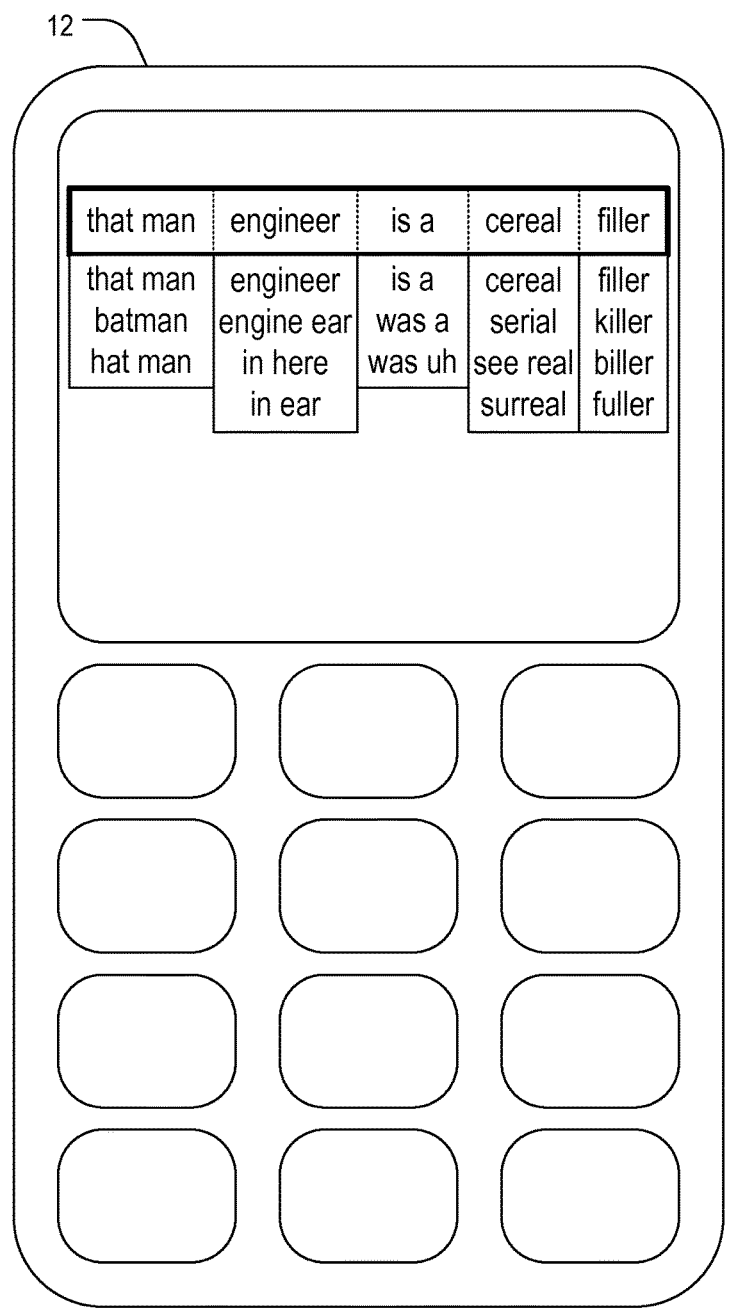
FIG. 7 is a graphical depiction, on a transmitting device, of the transcription of the utterance of FIG. 3, illustrating the various alternatives reached by the ASR engine for each portion of the utterance.

In another approach, the user 32 may be presented with all of the fragment results for all of the portions of the transcribed utterance at the same time. FIG. 7 is a graphical depiction, on a transmitting device 12, of the transcription of the utterance 36 of FIG. 3, illustrating the various alternatives reached by the ASR engine for each portion of the utterance 36. The final transcription result, representing the result in which the ASR engine has the highest confidence level, is presented at the top. Other fragment results returned by the ASR engine for each of the various portions of the utterance 36 are presented beneath the highest-confidence result. More particularly, "batman" and "hat man" are presented as alternative fragment results for the utterance fragment that became "that man;" "engine ear," "in here" and "ear" are presented as alternative fragment results for the utterance fragment that became "engineer;" "was a" and "was uh" are presented as alternative fragment results for the utterance fragment that became "is a;" "serial," "see real" and "surreal" are presented as alternative fragment results for the utterance fragment that became "cereal;" and "killer," "biller" and "fuller" are presented as alternative fragment results for the utterance fragment that became "filler."

In at least some embodiments, information about the order in which the ASR engine reached the results is provided in the form of animation or via other means, and such a process may be implemented, for example, in accordance with the disclosure of U.S. patent application Ser. No. 12/400,723, filed Mar. 9, 2009 and entitled "USE OF INTERMEDIATE SPEECH TRANSCRIPTION RESULTS IN EDITING FINAL SPEECH TRANSCRIPTION RESULTS," which, together with any corresponding patent application publications thereof, is incorporated herein by reference. For example, incremental results may be displayed in an animated, real-time visual display, which then updates frequently as new information becomes available. In this way, the user 32 is exposed to most or all of the options that the ASR engine considered during transcription and can more easily navigate to those options, after transcription is complete, in order to select a transcription option different from the one chosen by the engine as having the highest confidence value. Various techniques for displaying real time information about preliminary and intermediate transcription results are described in the aforementioned patent application.

Referring again to FIG. 7, it will be appreciated that each utterance fragment or portion, and its corresponding alternate transcriptions, may be a single word, or may be a phrase made up of multiple words. The drop-down lists, or any other graphical arrangement of alternate transcription fragments, can be displayed in an animated fashion after the entire transcription has been received. The lists of alternate transcription fragments can then be removed from the display leaving only the highest-confidence results visible.

Figure 8:
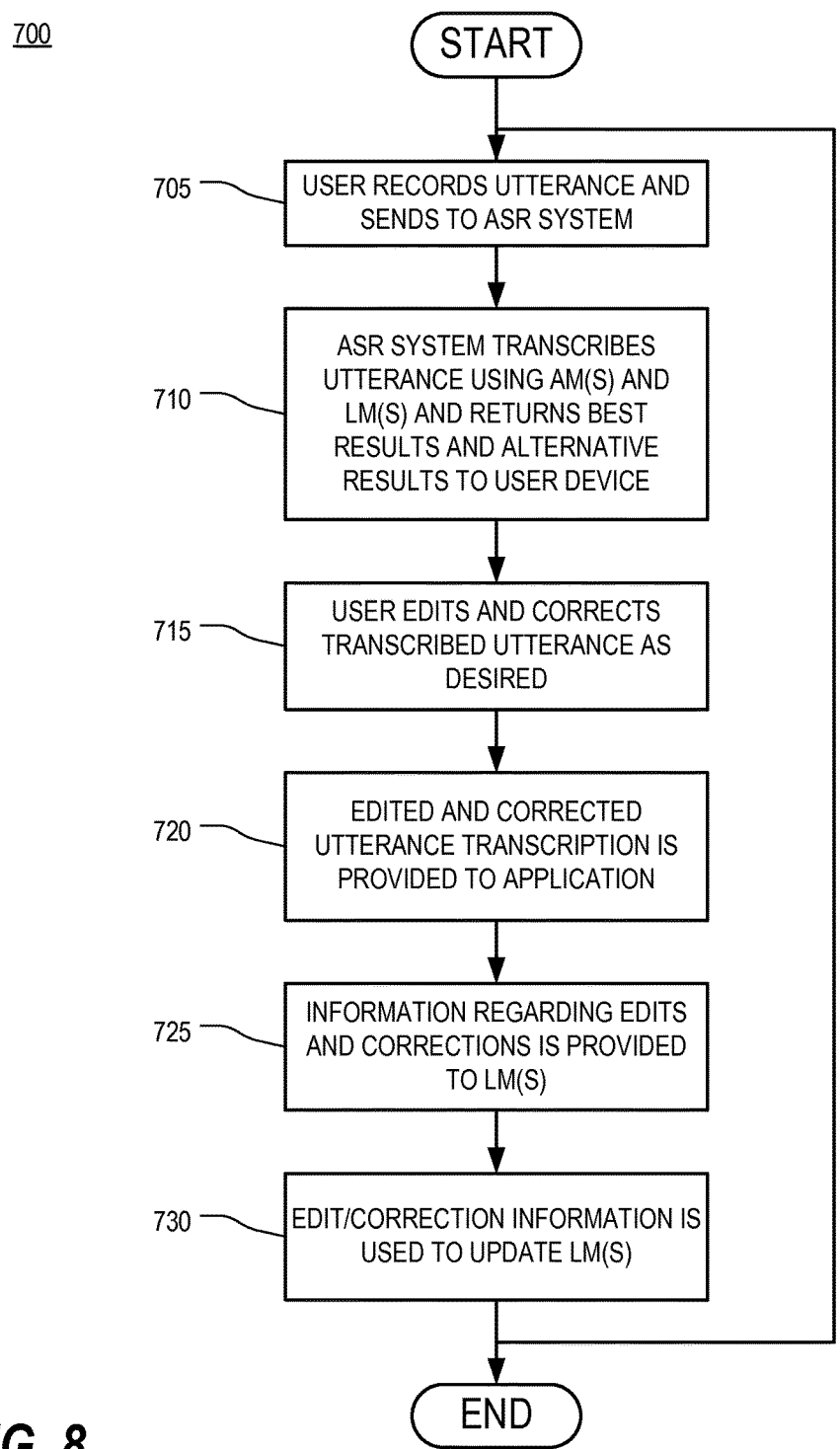
FIG. 8 is a high-level flowchart illustrating the operation of such a process.

By providing the user 32 with the ability to make edits and corrections to the results returned by the ASR engine, the system 10 gains the ability to use information about the edits and corrections made by the user 32 to update the LM(s) utilized by the ASR engine to produce the transcription. FIG. 8 is a high-level flowchart illustrating the operation of such a process 700. As shown therein, at least a portion of the process 700 begins at step 705 when the user 32 records an utterance 36 and sends the recorded utterance 36 to the ASR system 18 for transcription. At step 710, the ASR system 18 transcribes the utterance 36 using the current versions of one or more acoustic model (AM) and one or more statistical language model (LM) and then returns the transcribed utterance to the user's device. At step 715, the user edits and corrects the transcribed utterance as desired, and at step 720 the edited and corrected transcription is provided to a text message, voicemail, or other application. Importantly, however, at step 725 information regarding the edits and corrections made by the user is provided to the LMs used in the transcription process, or in some cases to other LMs as well, and at step 730 the information is used to update the LMs for further use, represented by the loop back to step 705.

Figure 9:
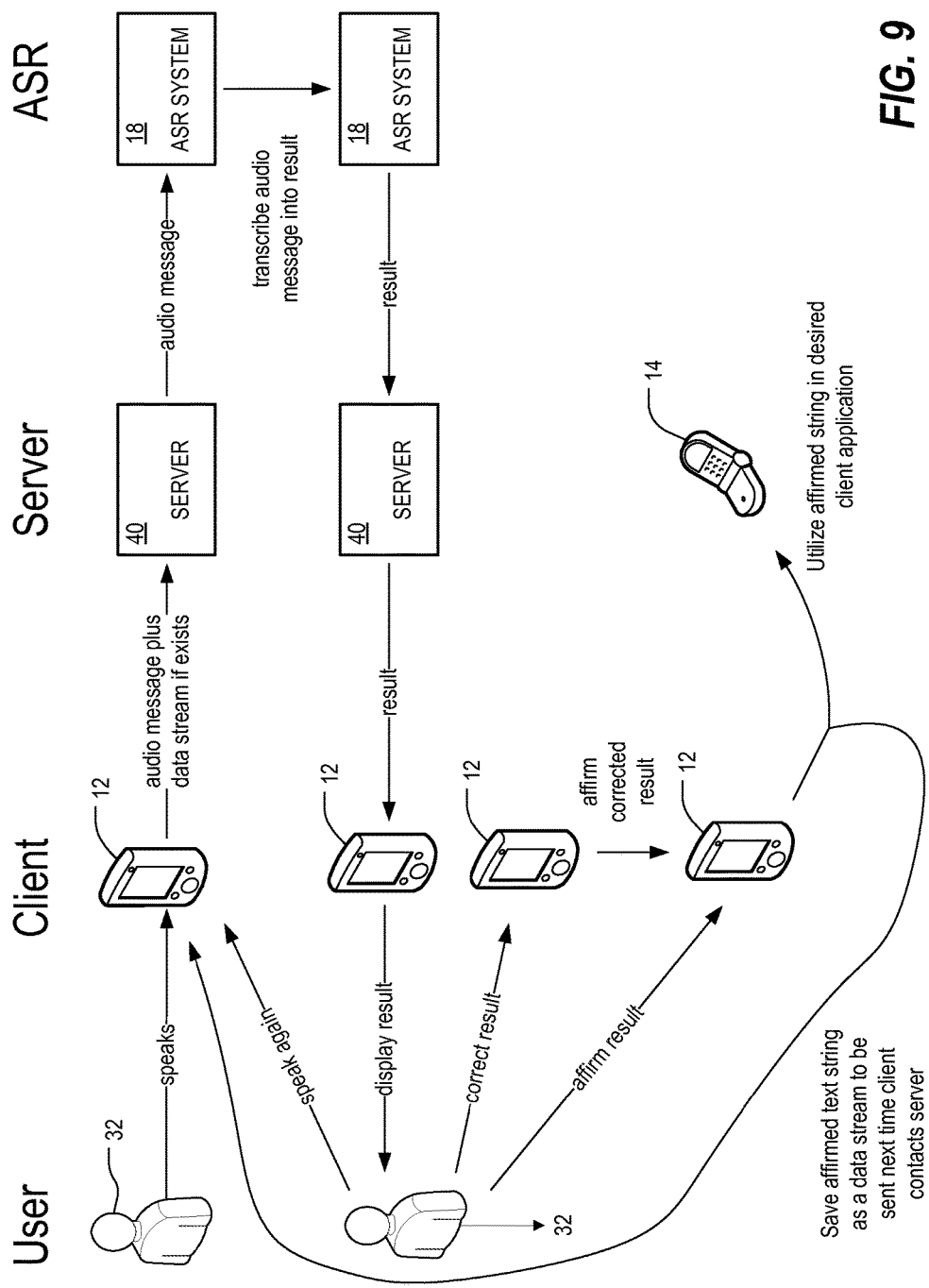
FIG. 9 is an operational flow diagram of a method for gathering data in accordance with one or more preferred embodiments of the present invention.
Figure 10:
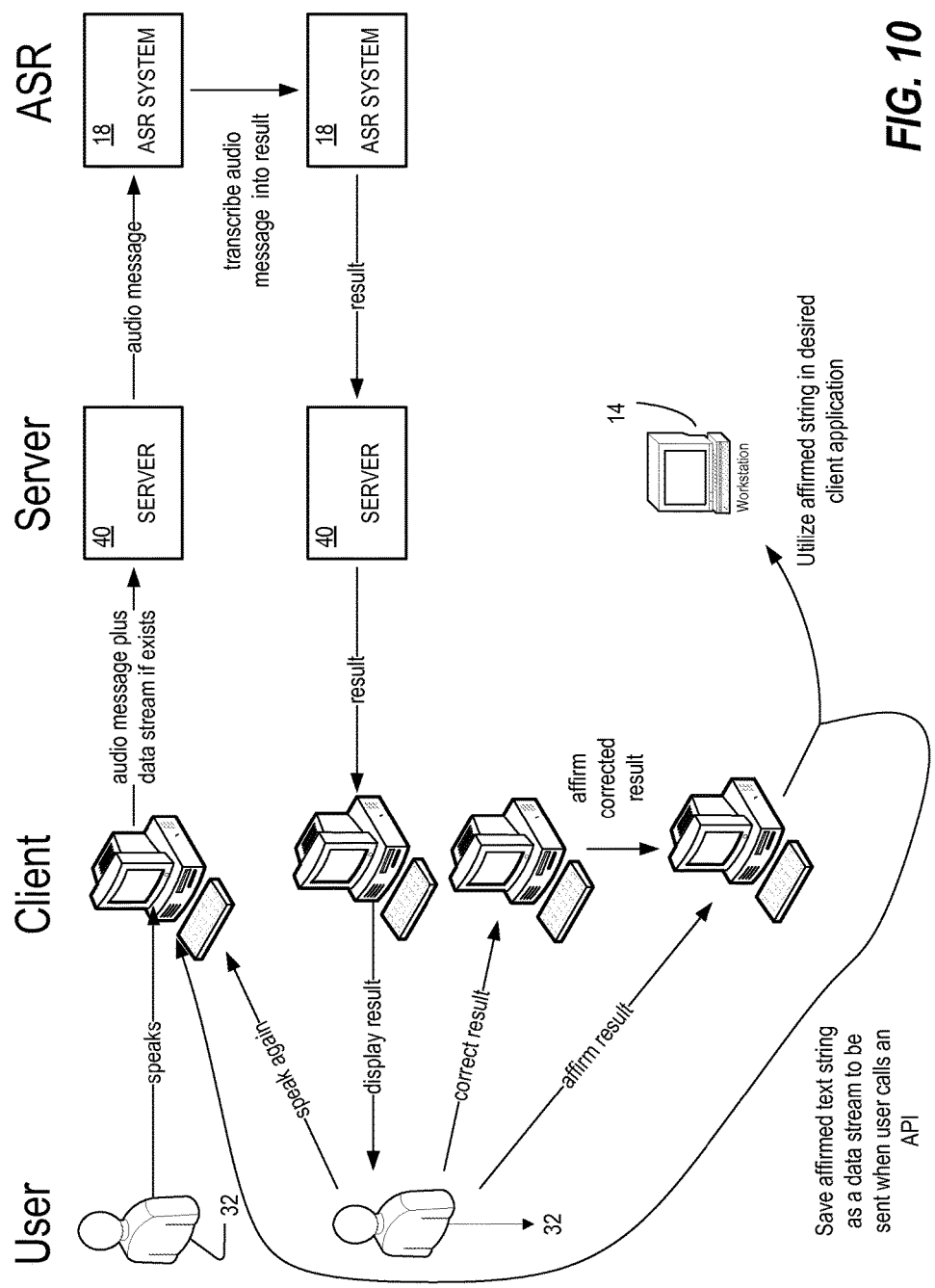
FIG. 10 is an operational flow diagram of a method for gathering data in accordance with one or more preferred embodiments of the present invention.

FIGS. 9 and 10 are operational flow diagrams of methods for gathering data 10 in accordance with one or more preferred embodiments of the present invention. Each method utilizes a client device 12; however, the methods differ in that FIG. 9 illustrates a preferred method for use with a client device 12 for which power management is desirable, such as a battery powered device, while FIG. 10 illustrates a preferred method for use with a client device 12 without as great of a need for power management, such as a device operating on AC power.

In either method, a user's 32 speech is captured, using for example, a microphone, at a client device 12 as an audio message. The audio message is communicated to a remote server 40, which may or may not be associated with the backend server 160 or even with the ASR system 18. The audio message is then processed utilizing the ASR system 18. The ASR system 18 transcribes the audio message into a string of text, i.e. a result, along with an alternative result matrix. The ASR system 18 communicates the result, together with the alternative result matrix, back to the remote server 40, which then communicates the result, together with the alternative result matrix, to the client device 12. The client device 12 displays the result to the user 32, who determines whether the result is an acceptable transcription of her speech.

If the user 32 determines that the result is satisfactory, then the user 32 affirms the result and the client device 12 utilizes the affirmed result as a text string in whatever manner the user 32 desires. The client device 12 additionally saves the affirmed result, together with an identifier comprising the original audio message or an identifier configured to allow the server 40 to locate the original audio message, as a data stream. In the preferred method of FIG. 9, the data stream is communicated to the server 40 the next time the client device contacts the server, while in the preferred method of FIG. 10, the data stream is sent to the server 40 when the user 32, or an application running at the client device 12, desires, via an API call.

If the user 32 determines that the result is not satisfactory, then the user 32 either attempts to correct the result by speaking into the client device 12 again, in which case the process will repeat, or else the user 32 manually corrects the result. The user 32 manually corrects the result by either selecting an alternate result using the alternative result matrix, or else by typing in the text he wishes. The user continues this loop until he affirms a result, or manually corrects a result. The client device 12 then utilizes the affirmed or corrected result ("selected result") as a text string in whatever manner the user 32 desires. The client device 12 additionally saves the selected result, together with an identifier comprising the original audio message or an identifier configured to allow the server to locate the original audio message, as a data stream. In the preferred method of FIG. 9, the data stream is communicated to the server 40 the next time the client device contacts the server, while in the preferred method of FIG. 10, the data stream is sent to the server 40 when the user 32, or an application running at the client device 12, desires, via an API call.

Figure 11:
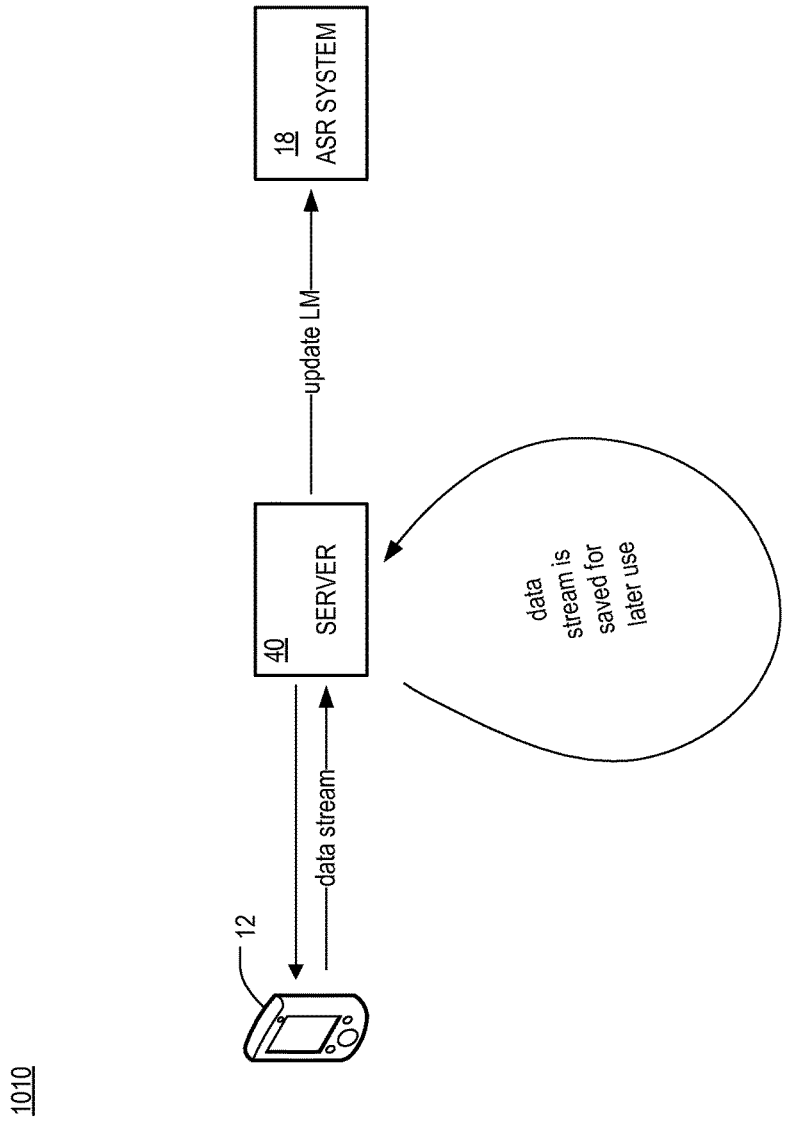
FIG. 11 is an operational flow diagram of a process for gathering data in accordance with one or more preferred embodiments of the present invention.

FIG. 11 is an operational flow diagram of a process 1010 for gathering data in accordance with one or more preferred embodiments of the present invention. First, a user device 12 transmits a data stream to a remote server 40. The remote server 40 either updates the LM in the ASR 18, or else saves the data stream for later use.

It will be appreciated that automated transcription of recorded utterances 36 is useful in other environments and applications as well. For example, in another system (not separately illustrated), a user speaks an utterance 36 into a device as a voicemail, and the recorded speech audio is sent to the ASR system 18. In another system, a system element that may or may not be associated directly with the ASR system 18 screens each word in a transcription for the availability of additional content associated with that word, and words for which content is available are enabled such that when one of the content-available words is spoken by the user, the ASR system 18 and/or other system elements recognize the spoken word and the additional content associated with that word is provided to the user, all in accordance with the disclosure of U.S. patent application Ser. No. 12/198,116, filed Aug. 25, 2008 and entitled "FACILITATING PRESENTATION BY MOBILE DEVICE OF ADDITIONAL CONTENT FOR A WORD OR PHRASE UPON UTTERANCE THEREOF," which, together with any corresponding patent application publications thereof, is incorporated herein by reference. Other applications to which the teachings of the present invention are applicable will be apparent to the Ordinary Artisan.

Commercial Implementation

One commercial implementation of the foregoing principles utilizes the Yap® and Yap9™ service (collectively, "the Yap service"), available from Yap Inc. of Charlotte, N.C. The Yap service includes one or more web applications and a client device application. The Yap web application is a J2EE application built using Java 5. It is designed to be deployed on an application server like IBM WebSphere Application Server or an equivalent J2EE application server. It is designed to be platform neutral, meaning the server hardware and OS can be anything supported by the web application server (e.g. Windows, Linux, MacOS X).

Figure 12:
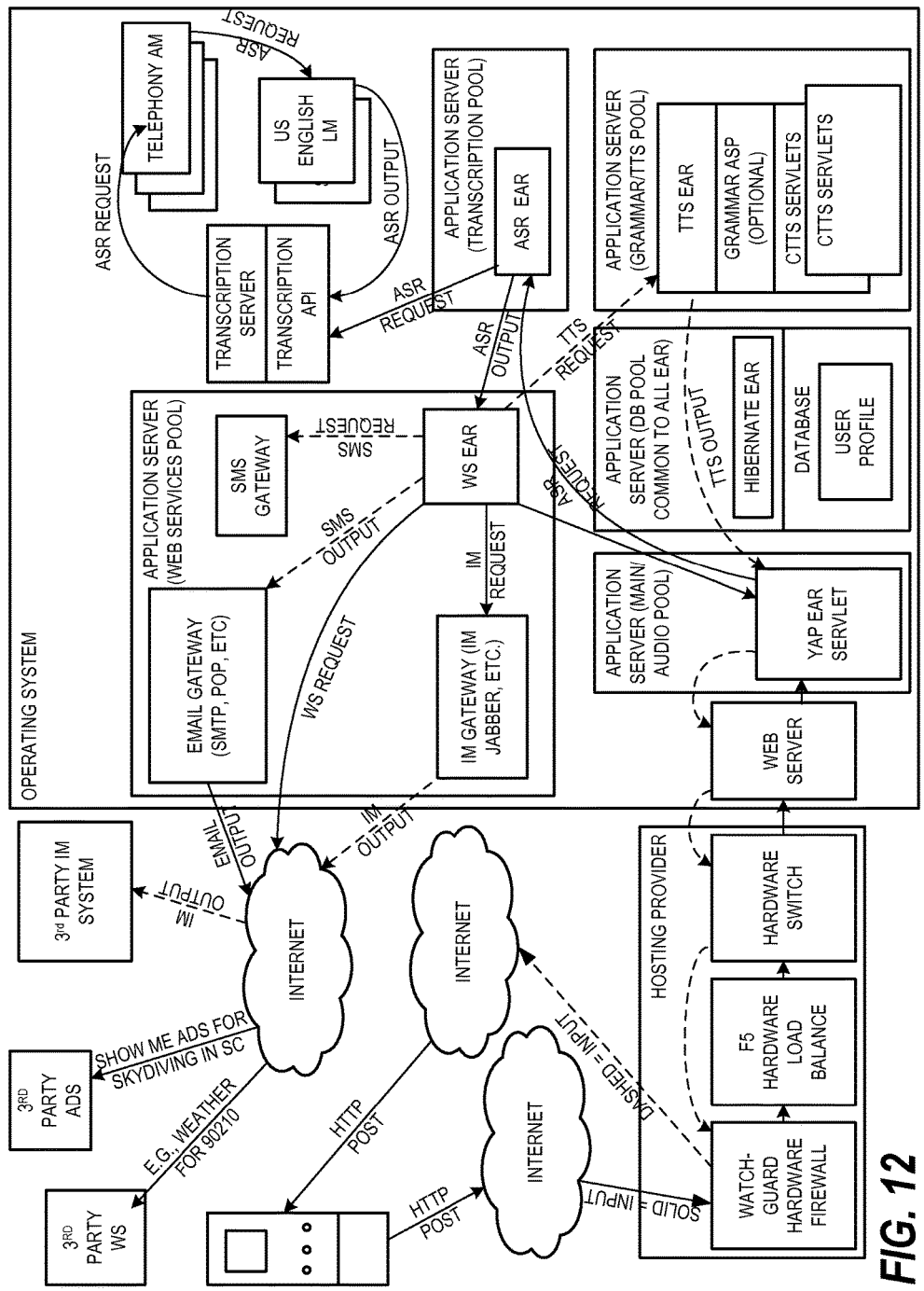
FIG. 12 is a block diagram of the system architecture of one commercial implementation.

FIG. 12 is a block diagram of the system architecture of the Yap commercial implementation. With reference to FIG. 12, the operating system may be implemented in Red Hat Enterprise Linux 5 (RHEL 5); the application servers may include the Websphere Application Server Community Edition (WAS-CE) servers, available from IBM; the web server may be an Apache server; the CTTS servlets may include CTTS servlets from Loquendo, including US/UK/ES male and US/UK/ES female; the Grammar ASP may be the latest WebSphere Voice Server, available from IBM; suitable third party ads may be provided by Google; a suitable third party IM system is Google Talk, available from Google; and a suitable database system is the DB2 Express relational database system, available from IBM.

Figure 13:
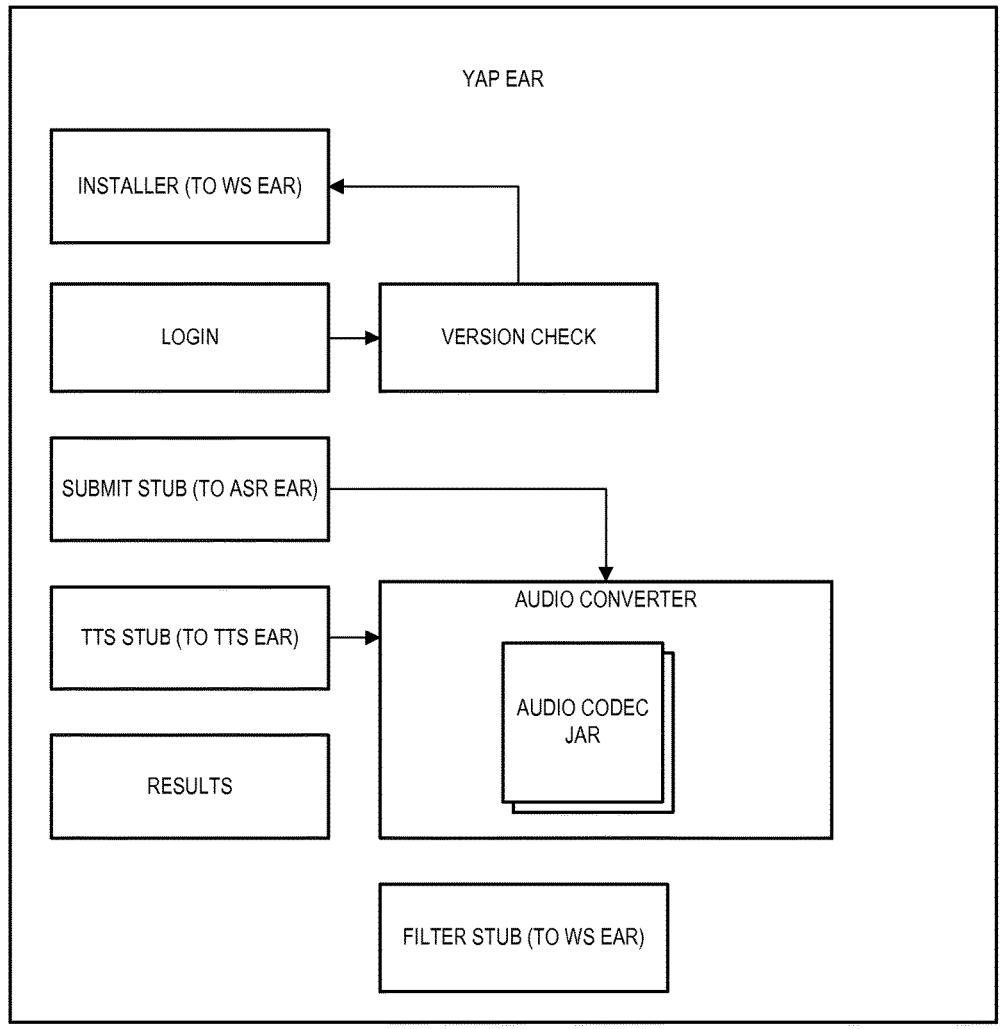
FIG. 13 is a block diagram of a portion of FIG. 12.

FIG. 13 is a block diagram of the Yap EAR of FIG. 12. The audio codec JARs may include the VoiceAge AMR JAR, available from VoiceAge of Montreal, Quebec and/or the QCELP JAR, available from Qualcomm of San Diego, Calif.

The Yap web application includes a plurality of servlets. As used herein, the term "servlet" refers to an object that receives a request and generates a response based on the request. Usually, a servlet is a small Java program that runs within a Web server. Servlets receive and respond to requests from Web clients, usually across HTTP and/or HTTPS, the HyperText Transfer Protocol. Currently, the Yap web application includes nine servlets: Correct, Debug, Install, Login, Notify, Ping, Results, Submit, and TTS. Each servlet is described below in the order typically encountered.

The communication protocol used for all messages between the Yap client and Yap server applications is HTTP and HTTPS. Using these standard web protocols allows the Yap web application to fit well in a web application container. From the application server's point of view, it cannot distinguish between the Yap client midlet and a typical web browser. This aspect of the design is intentional to convince the web application server that the Yap client midlet is actually a web browser. This allows a user to use features of the J2EE web programming model like session management and HTTPS security. It is also an important feature of the client as the MIDP specification requires that clients are allowed to communicate over HTTP.

More specifically, the Yap client uses the POST method and custom headers to pass values to the server. The body of the HTTP message in most cases is irrelevant with the exception of when the client submits audio data to the server in which case the body contains the binary audio data. The Server responds with an HTTP code indicating the success or failure of the request and data in the body which corresponds to the request being made. Preferably, the server does not depend on custom header messages being delivered to the client as the carriers can, and usually do, strip out unknown header values. FIG. 14 is a typical header section of an HTTP request from the Yap client.

The Yap client is operated via a user interface (UI), known as "Yap9," which is well suited for implementing methods of converting an audio message into a text message and messaging in mobile environments. Yap9 is a combined UI for SMS and web services (WS) that makes use of the buttons or keys of the client device by assigning a function to each button (sometimes referred to as a "Yap9" button or key). Execution of such functions is carried out by "Yaplets." This process, and the usage of such buttons, are described elsewhere herein and, in particular, in FIGS. 10A-10D, and accompanying text, of the aforementioned U.S. Patent Application Pub. No. US 2007/0239837.

Usage Process—Install:

Installation of the Yap client device application is described in the aforementioned U.S. Patent Application Pub. No. US 2007/0239837 in a subsection titled "Install Process" of a section titled "System Architecture."

Usage Process—Notify:

When a Yap client is installed, the install fails, or the install is canceled by the user, the Notify servlet is sent a message by the phone with a short description. This can be used for tracking purposes and to help diagnose any install problems.

Usage Process—Login:

When the Yap midlet is opened, the first step is to create a new session by logging into the Yap web application using the Login servlet. Preferably, however, multiple login servers exist, so as a preliminary step, a request is sent to find a server to log in to. Exemplary protocol details for such a request can be seen in FIG. 15. An HTTP string pointing to a selected login server will be returned in response to this request. It will be appreciated that this selection process functions as a poor man's load balancer.

After receiving this response, a login request is sent. Exemplary protocol details for such a request can be seen in FIG. 16. A cookie holding a session ID is returned in response to this request. The session ID is a pointer to a session object on the server which holds the state of the session. This session data will be discarded after a period determined by server policy.

Sessions are typically maintained using client-side cookies, however, a user cannot rely on the set-cookie header successfully returning to the Yap client because the carrier may remove that header from the HTTP response. The solution to this problem is to use the technique of URL rewriting. To do this, the session ID is extracted from the session API, which is returned to the client in the body of the response. This is called the "Yap Cookie" and is used in every subsequent request from the client. The Yap Cookie looks like this:

;jsessionid=C240B217F2351E3C420A599B0878371A

All requests from the client simply append this cookie to the end of each request and the session is maintained:

/Yap/Submit;
jsessionid=C240B217F2351E3C420A599B0878371A

Usage Process—Submit:

After receiving a session ID, audio data may be submitted. The user presses and holds one of the Yap-9 buttons, speaks aloud, and releases the pressed button. The speech is recorded, and the recorded speech is then sent in the body of a request to the Submit servlet, which returns a unique receipt that the client can use later to identify this utterance. Exemplary protocol details for such a request can be seen in FIG. 17.

One of the header values sent to the server during the login process is the format in which the device records. That value is stored in the session so the Submit servlet knows how to convert the audio into a format required by the ASR engine. This is done in a separate thread as the process can take some time to complete.

The Yap9 button and Yap9 screen numbers are passed to the Submit server in the HTTP request header. These values are used to lookup a user-defined preference of what each button is assigned to. For example, the 1 button may be used to transcribe audio for an SMS message, while the 2 button is designated for a grammar based recognition to be used in a web services location based search. The Submit servlet determines the appropriate "Yaplet" to use. When the engine has finished transcribing the audio or matching it against a grammar, the results are stored in a hash table in the session.

In the case of transcribed audio for an SMS text message, a number of filters can be applied to the text returned from the ASR engine. Such filters may include, but are not limited to, those shown Table 1.

TABLE 1

| Filter Type | Function |
| --- | --- |
| Ad Filter | Used to scan the text and identify keywords that can be used to insert targeted advertising messages, and/or convert the keywords into hyperlinks to ad sponsored web pages |
| Currency Filter | Used to format currency returned from the speech engine into the user's preferred format. (e.g., "one hundred twenty dollars" -> "$120.00") |
| Date Filter | Used to format dates returned from the speech engine into the user's preferred format. (e.g., "march fourth two thousand seven" -> "3/4/2007") |
| Digit Filter | User to format spelled out single digits returned from the speech engine into a multi-digit number such as a zip code (e.g., "two eight two one one" -> "28211") |
| Engine Filter | Used to remove speech engine words |
| Number Filter | Used to convert the spelled out numbers returned from the speech engine into a digit based number (e.g., "one hundred forty seven" -> "147") |
| Obscenity Filter | Used to place asterisks in for the vowels in street slang (e.g., "sh*t", "f*ck", etc.) |
| Punctuation Filter | Used to format punctuation |
| SMS Filter | Used to convert regular words into a spelling which more closely resembles an SMS message (e.g., "don't forget to smile" -> "don't 4get 2 :)", etc.) |
| Time Filter | Used to format time phrases |

Notably, after all of the filters are applied, both the filtered text and original text are returned to the client so that if text to speech is enabled for the user, the original unfiltered text can be used to generate the TTS audio.

Usage Process—Results:

The client retrieves the results of the audio by taking the receipt returned from the Submit servlet and submitting it as a request to the Results servlet. Exemplary protocol details for such a request can be seen in FIG. 18. This is done in a separate thread on the device and a timeout parameter may be specified which will cause the request to return after a certain amount of time if the results are not available. In response to the request, a block of XML is preferably returned. Exemplary protocol details for such a return response can be seen in FIG. 19. Alternatively, a serialized Java Results object may be returned. This object contains a number of getter functions for the client to extract the type of results screen to advance to (i.e., SMS or results list), the text to display, the text to be used for TTS, any advertising text to be displayed, an SMS trailer to append to the SMS message, etc.

Usage Process—TTS:

The user may choose to have the results read back via Text to Speech. This can be an option the user could disable to save network bandwidth, but adds value when in a situation where looking at the screen is not desirable, like when driving. If TTS is used, the TTS string is extracted from the results and sent via an HTTP request to the TTS servlet. Exemplary protocol details for such a request can be seen in FIG. 20. The request blocks until the TTS is generated and returns audio in the format supported by the phone in the body of the result. This is performed in a separate thread on the device since the transaction may take some time to complete. The resulting audio is then played to the user through the AudioService object on the client. Preferably, TTS speech from the server is encrypted using Corrected Block Tiny Encryption Algorithm (XXTEA) encryption.

Usage Process—Correct:

As a means of tracking accuracy and improving future SMS based language models, if the user makes a correction to transcribed text on the phone via the key elements of the key input unit 74 before sending the message, the corrected text is submitted to the Correct servlet along with the receipt for the request. This information is stored on the server for later use in analyzing accuracy and compiling a database of typical SMS messages. Exemplary protocol details for such a submission can be seen in FIG. 21.

Usage Process—Ping:

Typically, web sessions will timeout after a certain amount of inactivity. The Ping servlet can be used to send a quick message from the client to keep the session alive. Exemplary protocol details for such a message can be seen in FIG. 22.

Usage Process—Debug:

Used mainly for development purposes, the Debug servlet sends logging messages from the client to a debug log on the server. Exemplary protocol details can be seen in FIG. 23.

Usage Process—Logout:

To logout from the Yap server, an HTTP logout request needs to be issued to the server. An exemplary such request would take the form: "/Yap/Logout;jsessionid=1234", where 1234 is the session ID.

User Preferences:

In at least one embodiment, the Yap website has a section where the user can log in and customize their Yap client preferences. This allows them to choose from available Yaplets and assign them to Yap9 keys on their phone. The user preferences are stored and maintained on the server and accessible from the Yap web application. This frees the Yap client from having to know about all of the different back-end Yaplets. It just records the audio, submits it to the server along with the Yap9 key and Yap9 screen used for the recording and waits for the results. The server handles all of the details of what the user actually wants to have happen with the audio.

The client needs to know what type of format to utilize when presenting the results to the user. This is accomplished through a code in the Results object. The majority of requests fall into one of two categories: sending an SMS message, or displaying the results of a web services query in a list format. Notably, although these two are the most common, the Yap architecture supports the addition of new formats.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A computer-implemented method comprising:
   under control of a computing device configured with specific computer-executable instructions,
   generating audio data comprising speech;
   transmitting the audio data to a remote computing system including a speech recognition engine;
   receiving, from the remote computing system, a plurality of transcription results for a portion of a transcription of the speech, wherein the transcription has been generated from the audio data by the speech recognition engine;
   receiving, from the remote computing system, a confidence level for each transcription result of the plurality of transcription results, wherein the confidence level for each transcription result has been generated by the speech recognition engine, and wherein the confidence level for each transcription result of the plurality of transcription results represents a confidence in an accuracy of the transcription result;
   determining a ranked order for the plurality of transcription results from the confidence levels of the plurality of transcription results;
   presenting the plurality of transcription results for the portion of the transcription in the ranked order, with each transcription result of the plurality of transcription results presented with the confidence level for the transcription result; and
   receiving a selection, from the plurality of transcription results, of a first transcription result for the portion of the transcription.

2. The computer-implemented method of claim 1, further comprising storing the transcription with the first transcription result for the portion of the transcription.

3. The computer-implemented method of claim 1, wherein at least two transcription results of the plurality of transcription results satisfy a threshold confidence level, and further comprising:
   determining which transcription results of the plurality of transcription results for the portion have a confidence level satisfying a threshold confidence level, and
   wherein presenting the plurality of transcription results for the portion of the transcription comprises presenting the at least two transcription results, in the ranked order, that have a confidence level satisfying the threshold confidence level, with each transcription result of the at least two transcription results presented with the confidence level for the transcription result.

4. A computer-implemented method comprising:
   generating, at a computing device, audio data comprising speech;
   transmitting, by the computing device, the audio data to a remote computing system, wherein the remote computing system includes a speech recognition engine;
   receiving, at the computing device, a transcription of the speech from the remote computing system, wherein the transcription that has been generated from the audio data by the speech recognition engine of the remote computing system, and wherein the transcription includes a portion having a first transcription result and a second transcription result;
   receiving, at the computing device, a confidence level for the first transcription result and a confidence level for the second transcription result, wherein the confidence level for the first transcription result and the confidence level for the second transcription result have been generated by the speech recognition engine, and wherein the confidence level for the first transcription result is greater than the confidence level for the second transcription result;
   presenting, at the computing device, the transcription with the first transcription result for the portion;
   presenting, at the computing device, the second transcription result for the portion for selection as an alternative to the first transcription result for the portion;
   presenting at the computing device, at least the confidence level for the second transcription result; and
   receiving, at the computing device, selection of the second transcription result as the alternative to the first transcription result for the portion.

5. The computer-implemented method of claim 4, further comprising replacing, in the transcription, the first transcription result for the portion with the second transcription result for the portion.

6. The computer-implemented method of claim 4 further comprising transmitting the second transcription result for the portion to the remote computing system for replacing, in the transcription, the first transcription result for the portion with the second transcription result for the portion.

7. The computer-implemented method of claim 4, wherein presenting at the computing device, the confidence level for at least the second transcription result comprises presenting the confidence level for the first transcription result and the confidence level for second transcription result.

8. A device comprising:
   a microphone configured to capture speech;
   a memory configured to store audio data corresponding to the speech; and a processor in communication with the microphone and the memory, the processor configured to execute specific computer-executable instructions to at least;
provide the audio data to a speech recognition system;
receive a transcription of the speech from the speech recognition system, wherein the transcription that has been generated from the audio data by the speech recognition system, and wherein the transcription includes a portion having a first transcription result and a second transcription result;
receive a confidence level for the first transcription result and a confidence level for the second transcription result, wherein the confidence level for the first transcription result and the confidence level for the second transcription result have been generated by the speech recognition engine, and wherein the confidence level for the first transcription result is greater than the confidence level for the second transcription result;
present the transcription with the first transcription result for the portion;
present the second transcription result for the portion for selection as an alternative to the first transcription result for the portion;
present at least the confidence level for the second transcription result; and
receive a selection of the second transcription result as the alternative to the first transcription result for the portion.

9. The device of claim 8, wherein the processor is configured to further execute the specific computer-executable instructions to at least replace, in the transcription, the first transcription result for the portion with the second transcription result for the portion.

10. The device of claim 8, wherein the processor is configured to further execute the specific computer-executable instructions to at least transmit the second transcription result for the portion to the speech recognition system for replacing, in the transcription, the first transcription result for the portion with the second transcription result for the portion.

11. The device of claim 8, wherein the processor is configured to execute the specific computer-executable instructions present the confidence level for the first transcription result and the confidence level for the second transcription result.

12. The device of claim 8, wherein the processor is configured to further execute the specific computer-executable instructions to at least transmit information regarding the second transcription result to the speech recognition for updating a language model used by the speech recognition engine to generate another transcription.

13. A computing device comprising:
a memory configured to store audio data comprising speech; and
a processor in communication with the memory, the processor configured to execute specific computer-executable instructions to at least;
transmit the audio data comprising speech to a remote computing system including a speech recognition engine;
receive, from the remote computing system, a plurality of transcription results for a portion of a transcription of the speech, wherein the transcription has been generated from the audio data by the speech recognition engine;
receive, from the remote computing system, a confidence level for each transcription result of the plurality of transcription results, wherein the confidence level for each transcription result has been generated by the speech recognition engine, and wherein the confidence level for each transcription result of the plurality of transcription results represents a confidence in an accuracy of the transcription result; and
determine a ranked order for the plurality of transcription results from the confidence level's of the plurality of transcription results;
present the plurality of transcription results for the portion of the transcription in the ranked order, with each transcription result of the plurality of transcription results presented with the confidence level for the transcription result; and
receive a selection, from the plurality of transcription results, of a first transcription result for the portion of the transcription.

14. The computing device of claim 13, wherein the processor is configured to further execute the specific computer-executable instructions to at least store the transcription with the first transcription result for the portion of the transcription.

15. The computing device of claim 13, wherein at least two transcription results of the plurality of transcription results satisfy a threshold confidence level, and wherein the processor is configured to further execute the specific computer-executable instructions to at least:
determine which transcription results of the plurality of transcription results for the portion have a confidence level satisfying a threshold confidence level, and
present the at least two transcription results that have a confidence level satisfying the threshold confidence level, in the ranked order, when presenting the plurality of transcription results for the portion of the transcription, with each transcription result of the at least two transcription results presented with the confidence level for the transcription result.

16. The computing device of claim 13, wherein the processor is configured to further execute the specific computer-executable instructions to at least transmit the first transcription result for the portion of the transcription to the remote computing system.

* * * * *